United States Patent
Sankar et al.

(10) Patent No.: US 11,443,346 B2
(45) Date of Patent: Sep. 13, 2022

(54) GROUP ITEM RECOMMENDATIONS FOR EPHEMERAL GROUPS BASED ON MUTUAL INFORMATION MAXIMIZATION

(71) Applicant: Visa International Service Association, San Francisco, CA (US)

(72) Inventors: Aravind Sankar, San Francisco, CA (US); Yanhong Wu, San Francisco, CA (US); Yuhang Wu, Foster City, CA (US); Wei Zhang, Fremont, CA (US); Hao Yang, San Jose, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 65 days.

(21) Appl. No.: 17/070,772

(22) Filed: Oct. 14, 2020

(65) Prior Publication Data

US 2021/0110436 A1    Apr. 15, 2021

Related U.S. Application Data

(60) Provisional application No. 62/914,948, filed on Oct. 14, 2019.

(51) Int. Cl.
*G06Q 30/02* (2012.01)
*G06N 3/08* (2006.01)
(Continued)

(52) U.S. Cl.
CPC ....... *G06Q 30/0269* (2013.01); *G06F 16/335* (2019.01); *G06N 3/08* (2013.01); *H04L 67/306* (2013.01)

(58) Field of Classification Search
None
See application file for complete search history.

(56) References Cited

U.S. PATENT DOCUMENTS

2014/0380359 A1*   12/2014   Musil ............... H04N 21/6582
                                                    725/34
2016/0255170 A1*    9/2016   Gargi ................. H04L 67/306
                                                    709/204

FOREIGN PATENT DOCUMENTS

KR    20180089846 A  * 10/2018  ............. G06Q 30/02

OTHER PUBLICATIONS

H. Yin et al. "Social Influence-based Group representation Learning for Group Recommendation", 2019 IEEE 35th International Conference on Data Engineering, 2019. [retrieved from internet on Feb. 12, 2022] <URL: https://ieeexplore.ieee.org/document/8731382> (Year: 2019).*

(Continued)

*Primary Examiner* — Bion A Shelden
(74) *Attorney, Agent, or Firm* — Schwabe, Williamson & Wyatt, PC

(57) ABSTRACT

A computer-implemented method is disclosed for training neural networks of a group recommender to provide item recommendations for ephemeral groups having group interaction sparsity. A preference encoder and aggregator generate user and group preference embeddings from user-item interactions, wherein the preference embeddings form a latent user-group latent embedding space. The neural preference encoder and the aggregator are trained by regularizing the latent user-group embedding space to overcome the group interaction sparsity by: i) maximizing user-group mutual information (MI) between the group embeddings and the user embeddings so that the group embeddings encode shared group member preferences, while regularizing the user embeddings to capture user social associations, and ii) contextually identifying informative group members and regularizing the corresponding group embeddings using a contextually weighted user loss value to contextually weight (Continued)

users' personal preferences in proportion to their user-group MI to reflect personal preferences of the identified informative group members.

20 Claims, 15 Drawing Sheets

(51) Int. Cl.
*G06F 16/335* (2019.01)
*H04L 67/306* (2022.01)

(56) References Cited

OTHER PUBLICATIONS

E. Quintarelli et al. "Recommending New Items to Ephemeral Groups Using Contextual User Influence", RecSys '16: Proceedings of the 10th ACM Conference on Recommender Systems, Sep. 2016. [retrieved from internet on Feb. 12, 2022] <URL: https://dl.acm.org/doi/10.1145/2959100.2959137> (Year: 2016).*
D. Cao. "Attentive Group Recommendation", SIGIR '18: The 41st International ACM SIGIR Conference, Jun. 2018. [retrieved from internet on Dec. 2, 2022] <URL: https://dl.acm.org/doi/pdf/10.1145/3209978.3209998> (Year: 2018).*
T. Vinh. "Attention-based Group Recommendation," arXiv, Jul. 10, 2018. [retrieved from internet on Dec. 2, 2022] <URL: https://arxiv.org/pdf/1804.04327v3.pdf> (Year: 2018).*
M. Belghazi et al. "MINE: Mutual Information Neural Estimation", arXiv, Jun. 7, 2018. [retrieved from internet on Feb. 12, 2022] <URL: https://arxiv.org/abs/1801.04062v4> (Year: 2018).*
M. Ravanelli et al. "Learning Speaker Representations with Mutual Information", arXiv, Apr. 5, 2019. [retrieved from internet on Feb. 12, 2022] <URL: https://arxiv.org/abs/1812.00271> (Year: 2019).*
Sihem Amer-Yahia, Senjuti Basu Roy, Ashish Chawlat, Gautam Das, and Cong Yu. 2009. Group recommendation: Semantics and efficiency. VLDB 2, 1 (2009), 754-765.
Dzmitry Bahdanau, Kyunghyun Cho, and Yoshua Bengio. 2014. Neural machine translation by jointly learning to align and translate. arXiv preprint arXiv:1409.0473 (2014).
Linas Baltrunas, Tadas Makcinskas, and Francesco Ricci. 2010. Group recommendations with rank aggregation and collaborative filtering. In RecSys. 119-126.
Mohamed Ishmael Belghazi, Aristide Baratin, Sai Rajeshwar, Sherjil Ozair, Yoshua Bengio, Devon Hjelm, and Aaron Courville. 2018. Mutual Information Neural Estimation. In ICML. 530-539.
Shlomo Berkovsky and Jill Freyne. 2010. Group-based recipe recommendations: analysis of data aggregation strategies. In RecSys. ACM, 111-118.
Ludovico Boratto and Salvatore Carta. 2010. State-of-the-art in group recommendation and new approaches for automatic identification of groups. In Information retrieval and mining in distributed environments. Springer, 1-20.
Da Cao, Xiangnan He, Lianhai Miao, Yahui An, Chao Yang, and Richang Hong. 2018. Attentive group recommendation. In SIGIR. ACM, 645-654.
Da Cao, Xiangnan He, Lianhai Miao, Guangyi Xiao, Hao Chen, and Jiao Xu. 2019. Social-Enhanced Attentive Group Recommendation. IEEE TKDE (2019).
Paolo Cremonesi, Yehuda Koren, and Roberto Turrin. 2010. Performance of recommender algorithms on top-n recommendation tasks. In RecSys. 39-46.
Amra Delic, Judith Masthoff, Julia Neidhardt, and Hannes Werthner. 2018. How to Use Social Relationships in Group Recommenders: Empirical Evidence In UMAP. ACM, 121-129.
Amra Delic, Julia Neidhardt, Thuy Ngoc Nguyen, and Francesco Ricci. 2018. An observational user study for group recommender systems in the tourism domain. Information Technology & Tourism 19, 1-4 (2018), 87-116.

Miike Gartrell, Xinyu Xing, Qin Lv, Aaron Beach, Richard Han, Shivakant Mishra, and Karim Seada. 2010. Enhancing group recommendation by incorporating social relationship interactions. In Group. 97-106.
Will Hamilton, Zhitao Ying, and Jure Leskovec. 2017. Inductive representation learning on large graphs. In NIPS. 1024-1034.
Xiangnan He, Lizi Liao, Hanwang Zhang, Liqiang Nie, Xia Hu, and Tat-Seng Chua. 2017. Neural collaborative filtering. In WWW. 173-182.
R. Devon Hjelm, Alex Fedorov, Samuel Lavoie-Marchildon, Karan Grewal, Philip Bachman, Adam Trischler, and Yoshua Bengio. 2019. Learning deep representations by mutual information estimation and maximization. In ICLR.
Liang Hu, Jian Cao, Guandong Xu, Longbing Cao, Zhiping Gu, and Wei Cao. 2014. Deep modeling of group preferences for group-based recommendation. In AAAI.
Adit Krishnan, Hari Cheruvu, Cheng Tao, and Hari Sundaram. 2019. A modular adversarial approach to social recommendation. In CIKM. 1753-1762.
Adit Krishnan, Mahashweta Das, Mangesh Bendre, Hao Yang, and Hari Sundaram. 2020. Transfer Learning via Contextual Invariants for One-to-Many Cross-Domain Recommendation. arXiv preprint arXiv:2005.10473 (2020).
Adit Krishnan, Ashish Sharma, Aravind Sankar, and Hari Sundaram. 2018. An adversarial approach to improve long-tail performance in neural collaborative with contrastive predictive coding. arXiv preprint arXiv: 1807.03748 (2018).
Adam Paszke, Sam Gross, Soumith Chintala, Gregory Chanan, Edward Yang, Zachary DeVito, Zeming Lin, Alban Desmaison, Luca Antiga, and Adam Lerer. 2017. Automatic differentiation in PyTorch. In NIPS-W.
Elisa Quintarelli, Emanuele Rabosio, and Letizia Tanca. 2016. Recommending new items to ephemeral groups using contextual user influence. In ReeSys. ACM, 285-292.
Vineeth Rakesh, Wang-Chien Lee, and Chandan K Reddy. 2016. Probabilistic group recommendation model for crowdfunding domains. In WSDM. ACM, 257-266.
Mengye Ren, Wenyuan Zeng, Bin Yang, and Raquel Urtasun. 2018. Learning to Reweight Examples for Robust Deep Learning. In ICML. 4331-4340.
Steffen Rendle, Christoph Freudenthaler, Zeno Gantner, and Lars Schmidt-Thieme. 2009. BPR: Bayesian personalized ranking from implicit feedback. In UAI. AUAI Press, 452-461.
Aravind Sankar, Yanhong Wu, Liang Gou, Wei Zhang, and Hao Yang. 2020. DySAT: Deep Neural Representation Learning on Dynamic Graphs via Self-Attention Networks. In WSDM. 519-527.
Aravind Sankar, Xinyang Zhang, Adit Krishnan, and Jiawei Han. 2020. Inf-VAE: A Variational Autoencoder Framework to Integrate Homophily and Influence in Diffusion Prediction. In WSDM. 510-518.
Saúl Vargas and Pablo Castells. 2011. Rank and relevance in novelty and diversity metrics for recommender systems. In ReeSys. ACM, 109-116.
Petar Veličković, William Fedus, William L. Hamilton, Pietro Liò, Yoshua Bengio, and R Devon Hjelm. 2019. Deep Graph Infomax. In ICLR.
Lucas Vinh Tran, Tuan-Anh Nguyen Pham, Yi Tay, Yiding Liu, Gao Cong, and Xiaoli Li. 2019. Interact and Decide: Medley of Sub-Attention Networks for Effective Group Recommendation. In SIGIR. ACM, 255-264.
Haiyan Wang, Yuliang Li, and Felix Frimpong. 2019. Group Recommendation via Self-Attention and Collaborative Metric Learning Model. IEEE Access 7 (2019), 164844-164855.
Keyulu Xu, Weihua Hu, Jure Leskovec, and Stefanie Jegelka. 2019. How Powerful are Graph Neural Networks?. In ICLR.
Yi-Ting Yeh and Yun-Nung Chen. 2019. QAInfomax: Learning Robust Question Answering System by Mutual Information Maximization. In EMNLP. 3368-3373.
Hongzhi Yin, Qinyong Wang, Kai Zheng, Zhixu Li, Jiali Yang, and Xiaofang Zhou. 2019. Social influence-based group representation learning for group recommendation In ICDE. IEEE, 566-577.

(56) References Cited

OTHER PUBLICATIONS

Zhiwen Yu, Xingshe Zhou, Yanbin Hao, and Jianhua Gu. 2006. TV program recommendation for multiple viewers based on user profile merging. User modeling and user-adapted interaction 16, 1 (2006), 63-82.

Quan Yuan, Gao Cong, and Chin-Yew Lin. 2014. COM: a generative model for group recommendation. In KDD. ACM, 163-172.

Manzil Zaheer, Satwik Kottur, Siamak Ravanbakhsh, Barnabas Poczos, Ruslan R Salakhutdinov, and Alexander J Smola. 2017. Deep sets. In NIPS. 3391-3401.

Shuai Zhang, Lina Yao, Aixin Sun, and Yi Tay. 2019. Deep Learning Based Recommender System: A Survey and New Perspectives. ACM Comput. Surv. 52, 1 (2019), 5:1-5:38.

Yong Zheng. 2018. Identifying Dominators and Followers in Group Decision Making based on The Personality Traits. In IUI Workshops.

\* cited by examiner

| | Yelp (LA) | Weeplaces | Gowalla | Douban |
|---|---|---|---|---|
| # users | 7,037 | 8,643 | 25,405 | 23,032 |
| # items | 7,671 | 25,081 | 38,306 | 10,039 |
| # groups | 10,214 | 22,733 | 44,565 | 58,983 |
| Average # items/user | 31.3 | 58.8 | 40.4 | 75.2 |
| Average # items/group | 1.1 | 2.9 | 3.5 | 1.6 |
| Average group size | 6.8 | 2.9 | 2.8 | 4.2 |

FIG. 6

| Dataset | Yelp(LA) | | | | Weeplaces | | | | Gowalla | | | | Douban | | | |
|---|---|---|---|---|---|---|---|---|---|---|---|---|---|---|---|---|
| Metric | N@20 | N@50 | R@20 | R@50 | N@20 | N@50 | R@20 | R@50 | N@20 | N@50 | R@20 | R@50 | N@20 | N@50 | R@20 | R@50 |
| Predefined Score Aggregators | | | | | | | | | | | | | | | | |
| Popularity [9] | 0.000 | 0.000 | 0.001 | 0.001 | 0.063 | 0.074 | 0.126 | 0.176 | 0.075 | 0.088 | 0.143 | 0.203 | 0.003 | 0.005 | 0.009 | 0.018 |
| VAE-CF + AVG [5, 20] | 0.142 | 0.179 | 0.322 | 0.513 | 0.273 | 0.313 | 0.502 | 0.666 | 0.318 | 0.362 | 0.580 | 0.738 | 0.179 | 0.217 | 0.381 | 0.558 |
| VAE-CF + LM [3, 20] | 0.097 | 0.120 | 0.198 | 0.316 | 0.277 | 0.311 | 0.498 | 0.640 | 0.375 | 0.409 | 0.610 | 0.750 | 0.221 | 0.252 | 0.414 | 0.555 |
| VAE-CF + MAX [6, 20] | 0.099 | 0.133 | 0.231 | 0.401 | 0.229 | 0.270 | 0.431 | 0.604 | 0.267 | 0.316 | 0.498 | 0.702 | 0.156 | 0.194 | 0.339 | 0.517 |
| VAE-CF + RD [1, 20] | 0.143 | 0.181 | 0.321 | 0.513 | 0.239 | 0.279 | 0.466 | 0.634 | 0.294 | 0.339 | 0.543 | 0.723 | 0.178 | 0.216 | 0.379 | 0.557 |
| Data-driven Preference Aggregators | | | | | | | | | | | | | | | | |
| COM [40] | 0.143 | 0.154 | 0.232 | 0.286 | 0.329 | 0.348 | 0.472 | 0.557 | 0.223 | 0.234 | 0.326 | 0.365 | 0.283 | 0.288 | 0.417 | 0.436 |
| Crowdrec [27] | 0.082 | 0.101 | 0.217 | 0.315 | 0.353 | 0.370 | 0.534 | 0.609 | 0.325 | 0.338 | 0.489 | 0.548 | 0.121 | 0.188 | 0.375 | 0.681 |
| AGREE [7] | 0.123 | 0.166 | 0.332 | 0.545 | 0.242 | 0.292 | 0.484 | 0.711 | 0.160 | 0.223 | 0.351 | 0.605 | 0.126 | 0.173 | 0.310 | 0.536 |
| MoSAN [34] | 0.470 | 0.494 | 0.757 | 0.875 | 0.287 | 0.334 | 0.548 | 0.738 | 0.323 | 0.372 | 0.584 | 0.779 | 0.193 | 0.239 | 0.424 | 0.639 |
| Group Information Maximization Recommenders (GroupIM) | | | | | | | | | | | | | | | | |
| GroupIM-Maxpool | 0.488 | 0.501 | 0.676 | 0.769 | 0.479 | 0.505 | 0.676 | 0.776 | 0.433 | 0.463 | 0.628 | 0.747 | 0.291 | 0.313 | 0.524 | 0.637 |
| GroupIM-Meanpool | 0.629 | 0.637 | 0.778 | 0.846 | 0.518 | 0.543 | 0.706 | 0.804 | 0.476 | 0.504 | 0.662 | 0.788 | 0.323 | 0.351 | 0.569 | 0.709 |
| GroupIM-Attention | 0.633 | 0.647 | 0.782 | 0.851 | 0.521 | 0.546 | 0.716 | 0.813 | 0.477 | 0.505 | 0.686 | 0.796 | 0.325 | 0.356 | 0.575 | 0.714 |

FIG. 7

| Dataset | Weeplaces | | Gowalla | |
|---|---|---|---|---|
| Metric | N@50 | R@50 | N@50 | R@50 |
| Base Group Recommender Variants | | | | |
| (1) Base ($L_G$) | 0.420 | 0.621 | 0.369 | 0.572 |
| (2) Base ($L_G + \lambda L_U$) | 0.427 | 0.653 | 0.401 | 0.647 |
| GroupIM Variants | | | | |
| (3) GroupIM ($L_G + L_{MI}$) | 0.431 | 0.646 | 0.391 | 0.625 |
| (4) GroupIM (Uniform weights) | 0.441 | 0.723 | 0.418 | 0.721 |
| (5) GroupIM (Cosine similarity) | 0.486 | 0.757 | 0.445 | 0.739 |
| (6) GroupIM (No pre-training) | 0.524 | 0.773 | 0.472 | 0.753 |
| (7) GroupIM ($L_G + \lambda L_{UG} + L_{MI}$) | 0.543 | 0.804 | 0.505 | 0.796 |

FIG. 9

GROUP ITEM RECOMMENDATIONS FOR EPHEMERAL GROUPS BASED ON MUTUAL INFORMATION MAXIMIZATION

CROSS-REFERENCE TO RELATED APPLICATIONS

This application claims the benefit of provisional Patent Application Ser. No. 62/914,928, filed Oct. 14, 2019, assigned to the assignee of the present application, and incorporated herein by reference.

BACKGROUND

Most traditional group recommendation systems or recommenders target existing groups with substantial activity history, while ephemeral groups comprising users who purchase very few (or no) items together, lack historical interactions. The problem is ubiquitous, and appears in a variety of familiar contexts, e.g., dining with strangers, watching movies with new friends, and attending social events. Key challenges can be illustrated with an example: Alice (who loves Mexican food) is taking a visitor Bob (who loves Italian food) to lunch along with her colleagues, where will they go to lunch? There are three things to note here: first, the group is ephemeral, since there is no historical interaction observed for this group. Second, individual preferences may depend on other group members. In this case, the group may go to a fine-dining Italian restaurant. However, when Alice is with other friends, they may go to Mexican restaurants. Third, groups comprise users with diverse individual preferences, and thus the group recommender needs to be cognizant of individual preferences.

Prior work primarily target persistent groups which refer to fixed, stable groups where members have interacted with numerous items as a group (e.g., families watching movies). The systems mainly fall into two categories: heuristic predefined aggregation (e.g., least misery) that disregards group interactions; and data-driven strategies such as probabilistic models and neural preference aggregators. A key weakness is that these methods either ignore individual user activities or assume that users have the same likelihood to follow individual and collective preferences, across different groups. Lack of expressivity to distinguish the role of individual preferences across groups results in degenerate solutions for sparse ephemeral groups. A few methods exploit external side information in the form of a social network, user personality traits and demographics, for group decision making. However, side information may often be unavailable.

Accordingly, what is needed is an item recommendation system for ephemeral groups that suggests items to users in the group.

BRIEF SUMMARY

Disclosed embodiments provides systems for group item recommendations for ephemeral groups based on mutual information maximization and methods for training group recommenders. A computer-implemented method trains embedding neural networks of a baexgroup recommender to provide item recommendations for ephemeral groups having group interaction sparsity. A neural preference encoder is provided to generate user preference embeddings from individual user-item interactions extracted from payment transaction records stored in a transaction database. A neural preference aggregator is provided to aggregate the user preference embeddings into group preference embeddings, wherein the user preference embeddings and the group preference embeddings form a latent user-group latent embedding space. The neural preference encoder and the aggregator are trained by regularizing the latent user-group embedding space to overcome the group interaction sparsity by: i) maximizing user-group mutual information (MI) between the group embeddings and the user embeddings so that the group embeddings encode shared group member preferences, while regularizing the user embeddings to capture user social associations, and ii) contextually identifying informative group members and regularizing the corresponding group embeddings using a contextually weighted user loss value to contextually weight users' personal preferences in proportion to their user-group MI to reflect personal preferences of the identified informative group members.

According to the process of training the neural networks, mutual information (MI)-guided weighting is used to regularize the group embeddings with the personal preferences of highly relevant group members. Experimental results on several real-world datasets indicate significant performance improvements (31-62% relative NDCG@20) over state-of-the-art group recommendation techniques.

BRIEF DESCRIPTION OF SEVERAL VIEWS OF THE DRAWINGS

FIG. 6 illustrates a table showing statistics of datasets used in example experiments.

FIG. 7 illustrate a Table showing group recommendation results on the four datasets, where R@K and N@K denote the Recall@K and NDCG@K metrics at K=20 and 50.

FIG. 9 illustrates a Table showing results of a GroupIM ablation study (NDCG and Recall at K=50).

DETAILED DESCRIPTION

Figure 1:
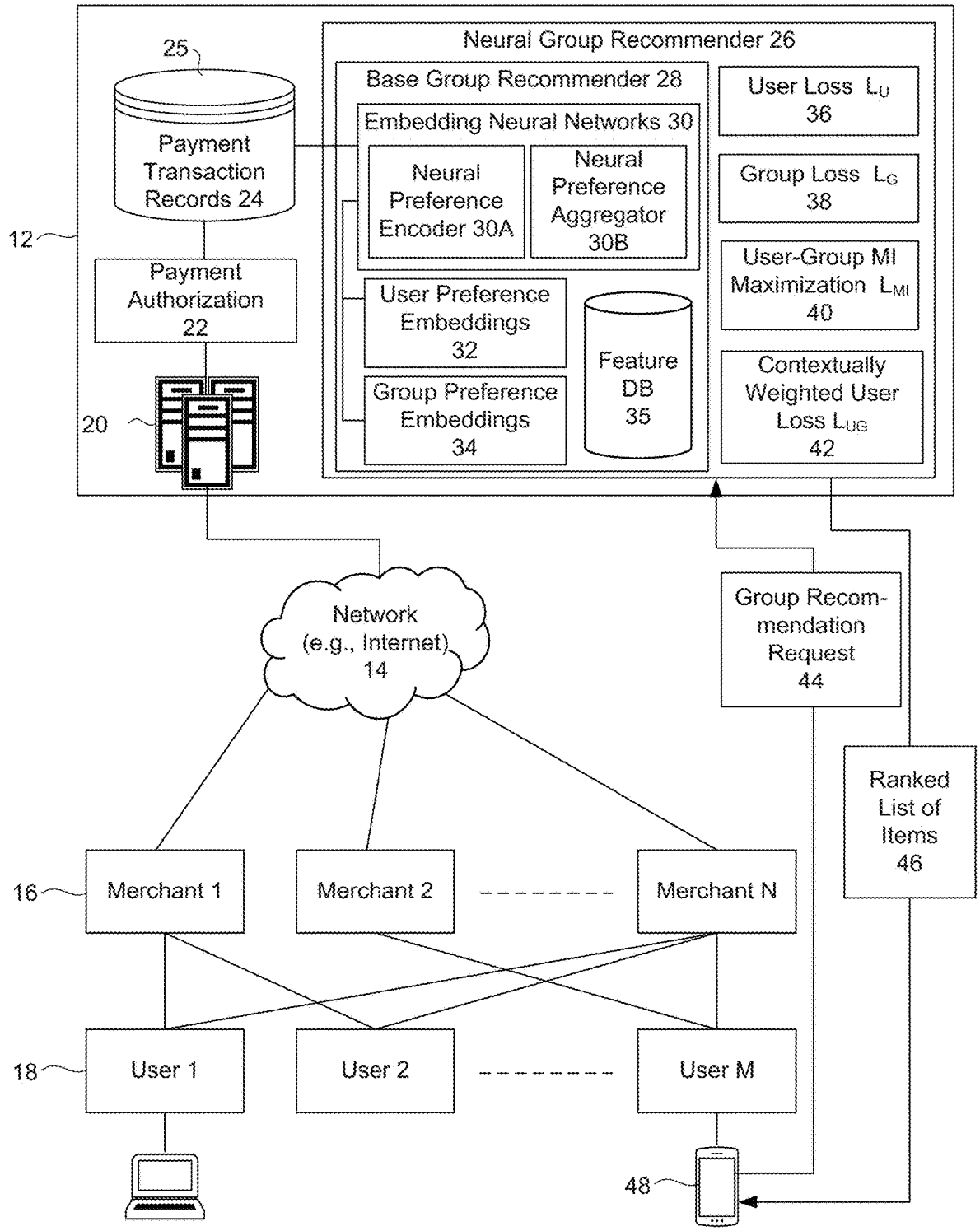
FIG. 1 is a diagram of one embodiment of a card payment processing system in which the disclosed embodiments may be implemented.

The disclosed embodiments relates to base group recommenders and training base group recommenders for ephemeral groups based on mutual information maximization. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

In the context of neural networks, embeddings are low-dimensional, learned continuous vector representations of discrete variables. Neural network embeddings may be used to find nearest neighbors in the embedding space, which can be used to make recommendations based on user interests or cluster categories. Neural network embeddings can also be used as input to a machine learning model for a supervised task. Neural network embeddings can be applied to payment transaction data to generate user embeddings in order to learn distributed representations of items, such a merchants, movies, etc., preferred by the user or cardholder. Several users may join together in a group to share an experience, such a meal at a restaurant, in which case a group recommendation is needed.

Group recommender systems can be divided into two categories based on group types: persistent and ephemeral. Persistent groups have stable members with rich activity history together, while ephemeral groups comprise users who interact with very few items together. A common approach is to consider persistent groups as virtual users, thus, personalized recommenders can be directly applied. However, such methods cannot handle ephemeral groups with sparse interactions. The disclosed embodiments focus on this more challenging scenario to provide recommendations to ephemeral groups.

Prior systems either aggregate recommendation results (or item scores) for each member, or aggregate individual member preferences, towards group predictions. They fall into two classes: score (or late) aggregation and preference (or early) aggregation. Popular score aggregation strategies include least misery, average, maximum satisfaction, and relevance and disagreement. However, these are hand-crafted heuristics that overlook real-world group interactions. The relative effectiveness of late aggregation systems depends on group size and group coherence. Early preference aggregation strategies generate recommendations by constructing a group profile that combines the raw item histories of group members. Recent methods adopt a model-based perspective to learn data-driven models. Probabilistic methods model the group generative process by considering both the personal preferences and relative influence of members, to differentiate their contributions towards group decisions. However, a key weakness is their assumption that users have the same likelihood to follow individual and collective preferences, across different groups. Neural methods explore ATTENTION mechanisms to learn data-driven preference aggregators. A neural method called MoSAN models group interactions via sub-attention networks; however, MoSAN operates on persistent groups while ignoring users' personal activities. Another neural method called AGREE employs attentional networks for joint training over individual and group interactions; yet, the extent of regularization applied on each user (based on personal activities) is the same across groups, which results in degenerate solutions when applied to ephemeral groups with sparse activities. An alternative approach to tackle interaction sparsity is to exploit external side information, e.g., social network of users, personality traits, demographics, and interpersonal relationships.

To overcome group interaction sparsity of ephemeral groups, the disclosed embodiments propose data-driven regularization strategies to exploit both the preference covariance amongst users who are in the same group, as well as the contextual relevance of users' individual preferences to each group. According to an aspect of the disclosed embodiments, the user-group latent embedding space generated by embedding neural networks is regularized to overcome group interaction sparsity by: i) maximizing mutual information between representations of groups and group members, and ii) dynamically prioritizing the preferences of highly informative members through contextual preference weighting. This results in a recommender architecture-agnostic that can train and integrate arbitrary neural preference encoders and aggregators for ephemeral group recommendation.

FIG. 1 is a diagram of one embodiment of a card payment processing system in which the disclosed embodiments may be implemented. The card payment processing system 10 may include a card payment processor 12 in communication (direct or indirect) over a network 14 with a plurality of merchants 16. A plurality of cardholders or users 18 purchase goods and/or services from various ones of the merchants 16 using a payment card such as a credit card, debit card, prepaid card and the like. Typically, the card payment processor 12 provides the merchants 16 with a service or device that allows the merchants to accept payment cards as well as to send payment details to the card payment processor 12 over the network 14. In some embodiments, an acquiring bank or processor (not shown) may forward the credit card details to the card payment processor 12. Payment card transactions may be performed using a variety of platforms such as brick and mortar stores, ecommerce stores, wireless terminals, and user mobile devices. The payment card transaction details sent over the network 14 are received by one or more servers 20 of the card payment processor 12 and processed by, for example, by a payment authorization process 22 and/or forwarded to an issuing bank (not shown). The payment card transaction details are stored as payment transaction records 24 in a transaction database 25.

The most basic and common type of payment transaction data is referred to as a level 1 transaction. The basic data fields of a level 1 payment card transaction are: i) merchant name, ii) billing zip code, and iii) transaction amount. Additional information, such as the date and time of the transaction and additional cardholder information may be automatically recorded, but is not explicitly reported by the merchant 16 processing the transaction. A level 2 transaction includes the same three data fields as the level 1 transaction, and in addition, the following data fields may be generated automatically by advanced point of payment systems for level 2 transactions: sales tax amount, customer reference number/code, merchant zip/postal code tax id, merchant minority code, merchant state code.

In one embodiment, the card payment processor 12 further includes a neural group recommender 26 that provides personalized item recommendations to ephemeral groups of users 18 based on each user's own payment transaction records 24 and past item preferences of the user and other users 18. The neural group recommender 26 can be configured to recommend any type of item occurring in history of payment transaction records 24, but for purposes of example, the neural group recommender 26 may be described as providing group recommendations for merchants and more specifically, restaurant merchants or simply restaurants.

In one embodiment, the neural group recommender 26 includes a base group recommender 28 that includes embedding neural networks 30 to generate users' preference embeddings 32 and group preference embeddings 34 from user, group and item information extracted from the payment transaction records 24. In embodiments, the embedding neural networks 30 comprise a model-based neural preference encoder 30A and a model-based neural preference aggregator 30B. According to embodiments, the neural group recommender 26 further generates a user loss ($L_U$) value 36, a group loss ($L_G$) value 38, a user-group mutual information (MI) maximization ($L_{MI}$) value 40 and a contextually weighted user loss ($L_{UG}$) value 42, which are used to train the embedding neural networks 30, as explained further below. Accordingly, the training methods of the disclosed embodiments are configured to train arbitrary types neural preference encoders and aggregators for ephemeral group recommendation to provide a recommender architecture-agnostic framework.

Once the neural preference encoder 30A and the neural preference aggregator 30B comprising the embedding neural networks 30 are trained, the neural group recommender 26 may receive a group recommendation request 44 from a member of an ephemeral group, and then generate new user embeddings 32 and group embeddings 34 to predict item preferences for that group. The neural group recommender 26 can respond to the group recommendation request 44 from a user 18 and provide a ranked list of items 46 in response. Alternatively, the neural group recommender 26 may push the ranked list of items 46 to one or more group members based on common user locations, a recent payment transaction, or other metric. In one embodiment, the user 18 may submit the group recommendation request 44 through a payment card, social media, or other type of application running on a user device 48, such as a smartphone, a laptop, a smartwatch or a tablet. Alternatively, users 18 may interact with the neural group recommender 26 through a conventional web browser.

In the embodiment shown, the neural group recommender 26 is shown as part of the payment processor 12. However, in an alternative embodiment, the neural group recommender 26 may be implemented separately from the card payment processor 12 and controlled by a third party. In one embodiment, the neural group recommender 26 is implemented as software components. In another embodiment, the components could be implemented as a combination of hardware and software. The functionality of the neural group recommender 26 may be combined into a lesser or greater number of modules/components than shown.

Although the server 20 is shown as a single computer, it should be understood that the functions of server 20 may be distributed over more than one server. The server 20 is shown hosting the neural group recommender 26, but in other embodiments, the neural group recommender 26 may run on any type of one more computers that have memory and processor. For example, in an alternative embodiment (not shown), the server 20 and the neural group recommender 26 may be implemented as a virtual entity whose functions are distributed over multiple user devices 46.

Both the server 20 and the user devices 46 may include hardware components of typical computing devices (not shown), including a processor, input devices (e.g., keyboard, pointing device, microphone for voice commands, buttons, touchscreen, etc.), and output devices (e.g., a display device, speakers, and the like). The server 20 and user devices 46 may include computer-readable media, e.g., memory and storage devices (e.g., flash memory, hard drive, optical disk drive, magnetic disk drive, and the like) containing computer instructions that implement the functionality disclosed herein when executed by the processor. The server 20 and the user devices 46 may further include wired or wireless network communication interfaces for communication.

The disclosed embodiments provide a method of training the embedding neural networks 30 of the base group recommender 28 without requiring the input of any extra side information. The training method is based on the following observations: first, while groups are ephemeral, group members may have rich individual interaction histories, which can be used to alleviate group interaction sparsity. Second, since ephemeral groups have sparse training interactions, the base group recommender 28 needs reliable guidance to learn informative (non-degenerate) group preference embeddings 34, but the guidance is data-driven, rather than a heuristic, according to embodiments.

Figure 2:
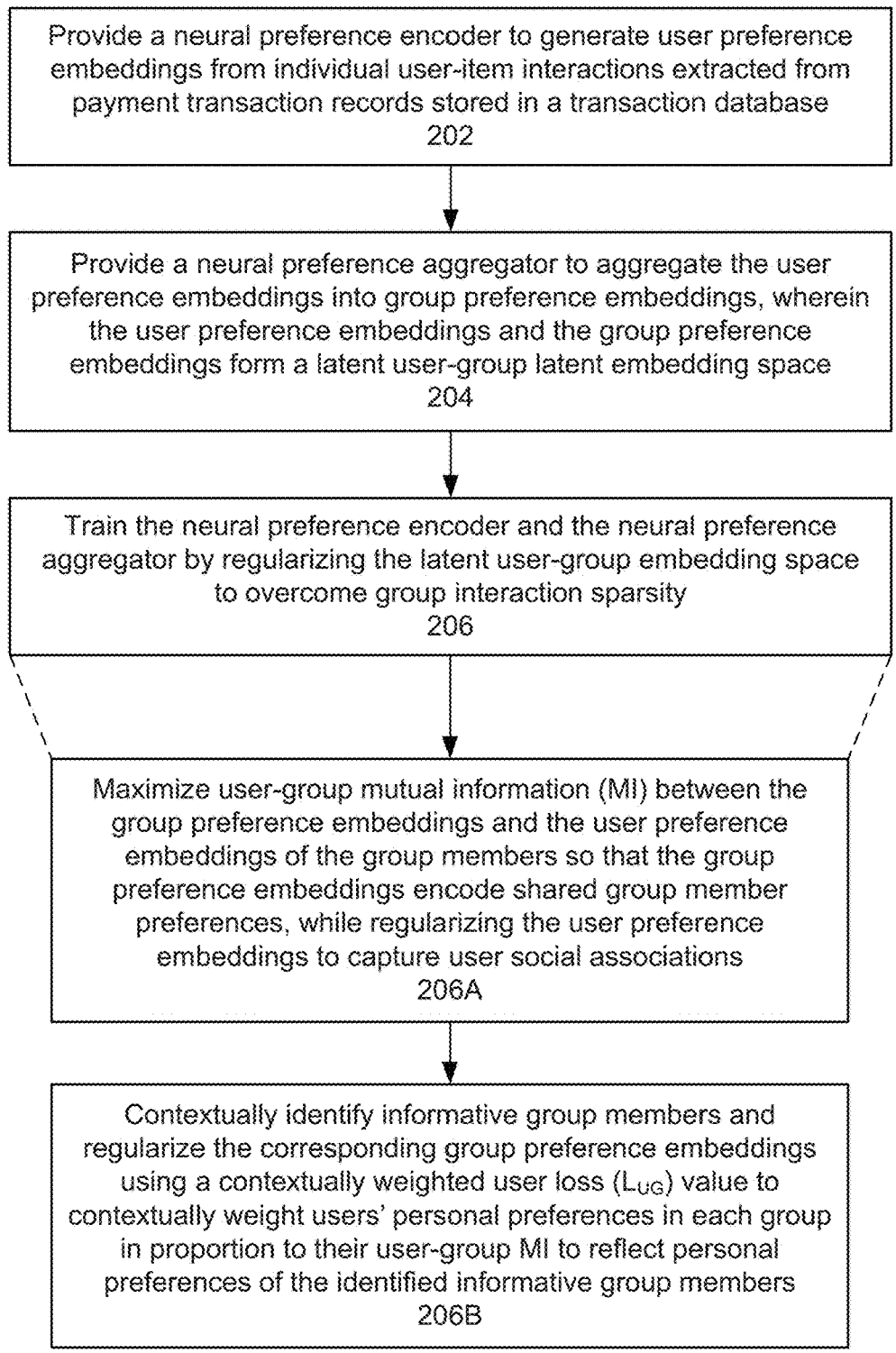
FIG. 2 is a flow diagram illustrating a process to train the embedding neural networks of a base group recommender to provide item recommendations for ephemeral groups of group members, which have group interaction sparsity.

FIG. 2 is a flow diagram illustrating a process to train the embedding neural networks of a base group recommender to provide item recommendations for ephemeral groups of group members, which have group interaction sparsity. The process 200 may begin by providing the base group recommender 28 with neural preference encoder 30A to generate user preference embeddings 32 from individual user-item interactions extracted from payment transaction records 24 stored in the transaction database 25 (block 202). The base group recommender 28 is also provided with neural preference aggregator 30B to aggregate the user preference embeddings 32 into group preference embeddings 34, wherein the user preference embeddings 32 and the group preference embeddings 34 form a latent user-group latent embedding space (block 204).

According to embodiments, the neural preference encoder 30A and the neural preference aggregator 30B are trained by regularizing the latent embedding space of user preference embeddings 32 and the group preference embeddings 34 to overcome ephemeral group interaction sparsity (block 206) in a manner that exploits the preference covariance amongst individuals who are in the same group, as well as to incorporate the contextual relevance of users' personal preferences to each group. Thus, the disclosed embodiments provide two data-driven regularization strategies.

First, embodiments contrastively regularize the user-group embedding latent space to capture social user associations and distinctions across groups. This is achieved by maximizing the user-group mutual information (MI) value 40 between the group preference embeddings 34 and the user preference embeddings 30 of the group members so that the group preference embeddings 34 encode shared group member preferences, while regularizing user preference embeddings 30 to capture user social associations (block 206A). Second, embodiments contextually identify informative group members and regularize E the corresponding group preference embeddings 34 using the contextually weighted user loss (LUG) value 42 that contextually weights users' personal preferences in each group in proportion to their user-group MI to reflect personal preferences of the identified informative group members (block 206B). Such Group-adaptive preference weighting precludes degenerate solutions that arise during static regularization over ephemeral groups with sparse activities.

Advantages of the disclosed embodiments include the following: first, the training method incorporates Group Information Maximization (GroupIM) to enable a recommender architecture-agnostic framework for group recommendation. Unlike prior work that requires customized preference aggregators, GroupIM can integrate arbitrary neural preference encoders and aggregators. Below, state-of-the-art results are shown with simple efficient aggregators (such as meanpool) that are contrastively regularized within the disclosed framework. The effectiveness of meanpool signifies substantially reduced inference costs without loss in model expressivity. Thus, GroupIM facilitates straightforward enhancements to base neural recommenders.

Second group-adaptive preference prioritization is provided. The training method learns robust estimates of group-specific member relevance. In contrast, prior work incorporate personal preferences through static regularization. The training method uses Mutual Information to dynamically learn user and group preference embeddings that capture preference covariance across individuals in the same group; and prioritize the preferences of highly relevant members through group-adaptive preference weighting, thus effectively overcoming group interaction sparsity in ephemeral groups. An ablation study confirms the superiority of the MI-based regularizers over static alternatives.

Third, the training method provides increases the performance of the neural group recommender 26, and therefore the performance of the servers 20 (and processors) executing the neural group recommender 26. This means users of the neural group recommender 26 are provided with improved item recommendations for ephemeral groups. Experimental results indicate significant performance gains for the GroupIM-based training over state-of-the-art group recommenders on four publicly available datasets (relative gains of 31-62% NDCG@20 and 3-28% Recall@20). Significantly, GroupIM achieves stronger gains for groups of larger sizes, and for groups with diverse member preferences.

The remainder of the disclosure is organized as follows. Immediately below, the problem is formally defined, a description of the base group recommender operation and its limitations is given, followed by a description of how the GroupIM framework is integrated into the base group recommender and experimental performance results thereof.

Figure 3A:
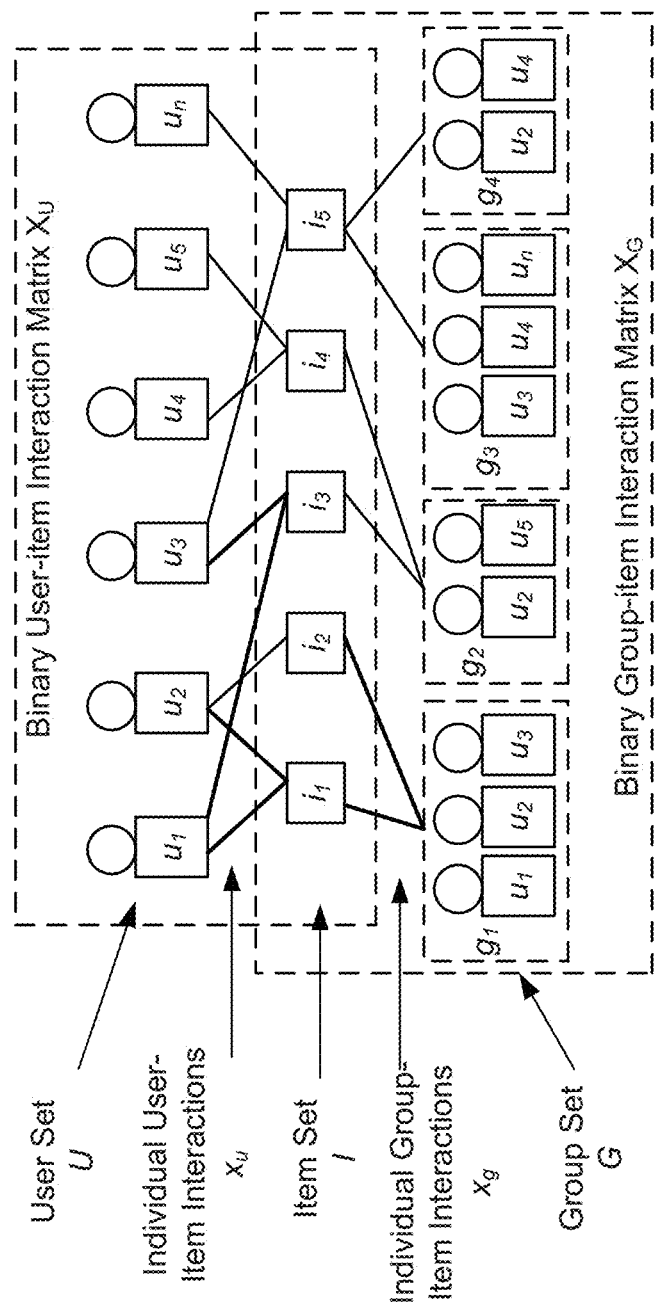
FIG. 3A is a diagram illustrating group and item information extracted from the payment transaction records.

FIG. 3A is a diagram illustrating group and item information extracted from the payment transaction records 24. In the embodiment where items are restaurants, the neural group recommender 26 considers implicit feedback of user visits to restaurants, rather than explicit ratings. The neural group recommender 26 extracts a user set U, and item set I, and a group set G. A binary |U|×|I| user-item interaction matrix, referred to simple as group-item interactions $X_U$, is generated from the users' interactions with various items. A binary |G|×|I| group-item interaction matrix, referred to simple as group-item interactions $X_G$, is generated from the groups' interactions with various items. In an embodiment, each user's individual user-item interactions $x_u$, and each group's individual group-item interactions $x_g$, denote corresponding rows for user u and group g in matrices $X_U$ and $X_G$, respectively, with $|x_u|$, $|x_g|$ indicating their respective number of interacted items. In an embodiment, each group g∈G comprises a set of |g| users (group members) $u^g = \{u^g_1, \ldots, u^g_{|g|}\} \subset U$ with sparse historical interactions $x_g$.

Given a strict ephemeral group g as input, the goal is to generate a ranked list over the item set I relevant to the group member, i.e., users in $u^g$, by learning a function $f_G$: P(U)×I f→R that maps an ephemeral group and an item to a relevance score, where P(U) is the power set of U.

Figure 3B:
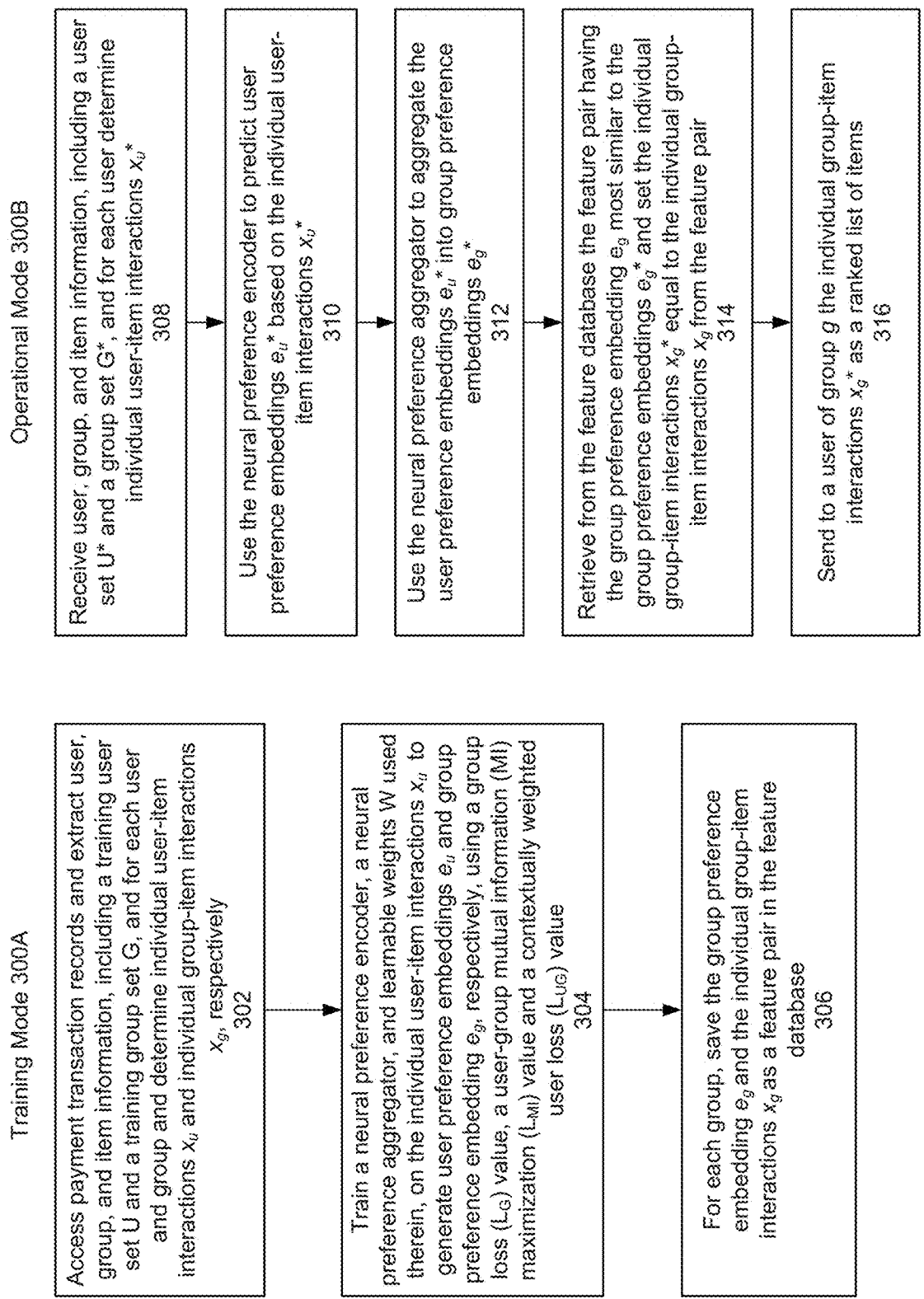
FIG. 3B is a flow diagram illustrating a process for generating item recommendations for ephemeral groups based on mutual information (MI) maximization performed by the neural group recommender according to one embodiment.

FIG. 3B is a flow diagram illustrating a process for generating item recommendations for ephemeral groups based on mutual information (MI) maximization performed by the neural group recommender 26 according to one embodiment. According to the disclosed embodiments, the process 300 includes operating the neural group recommender 26 in a training mode 300A and then operating the neural group recommender 26 in an operational mode 300B.

During the training mode 300A, the neural group recommender 26 accesses the payment transaction records 24 from the transaction database 25 and extracts user, group, and item information including a training user set U and a training group set G, and for each user and group, determines individual user-item interactions $x_u$ and individual group-item interactions $x_g$, respectively (block 302).

Next, the embedding neural networks 30, including the neural preference encoder 30A, a neural preference aggregator 30B, and learnable weights W used therein, are trained on the individual user-item interactions $x_u$ to generate user preference embeddings $e_u$ and group preference embeddings $e_g$, respectively, using a group loss ($L_G$) value 38, a user-group mutual information (MI) maximization ($L_{MI}$) value 40 and a contextually weighted user loss ($L_{UG}$) value 42 (block 304). In one embodiment, the group preference embeddings are jointly trained over the group-item interactions $X_G$ and user $X_U$ interactions, to make group recommendations.

The neural group recommender 26 then saves for each of the groups the group preference embedding $e_g$ and the individual group-item interactions $x_g$ as a feature pair in feature database 35 (block 306).

During the operational mode 300B, the neural group recommender 26 receives user, group, and item information, including a user set U* and a group set G*, and for each user determines individual user-item interactions $x_u^*$ (block 308). The neural preference encoder is used to predict user preference embeddings $e_u^*$ based on the individual user-item interactions $x_u^*$ (block 310). The neural preference aggregator is used to aggregate the user preference embeddings $e_u^*$ into group preference embeddings $e_g^*$ (block 312). The neural group recommender 26 retrieves from the feature database 35 the feature pair having a group preference embedding $e_g$ that is most similar to the group preference embeddings $e_g^*$ and sets the individual group-item interactions $x_g^*$ equal to the individual group-item interactions $x_g$ from the feature pair (block 314). The individual group-item interactions $x_g^*$ are then sent to a user of group g as the ranked list of items 46 (block 316).

Figure 4:
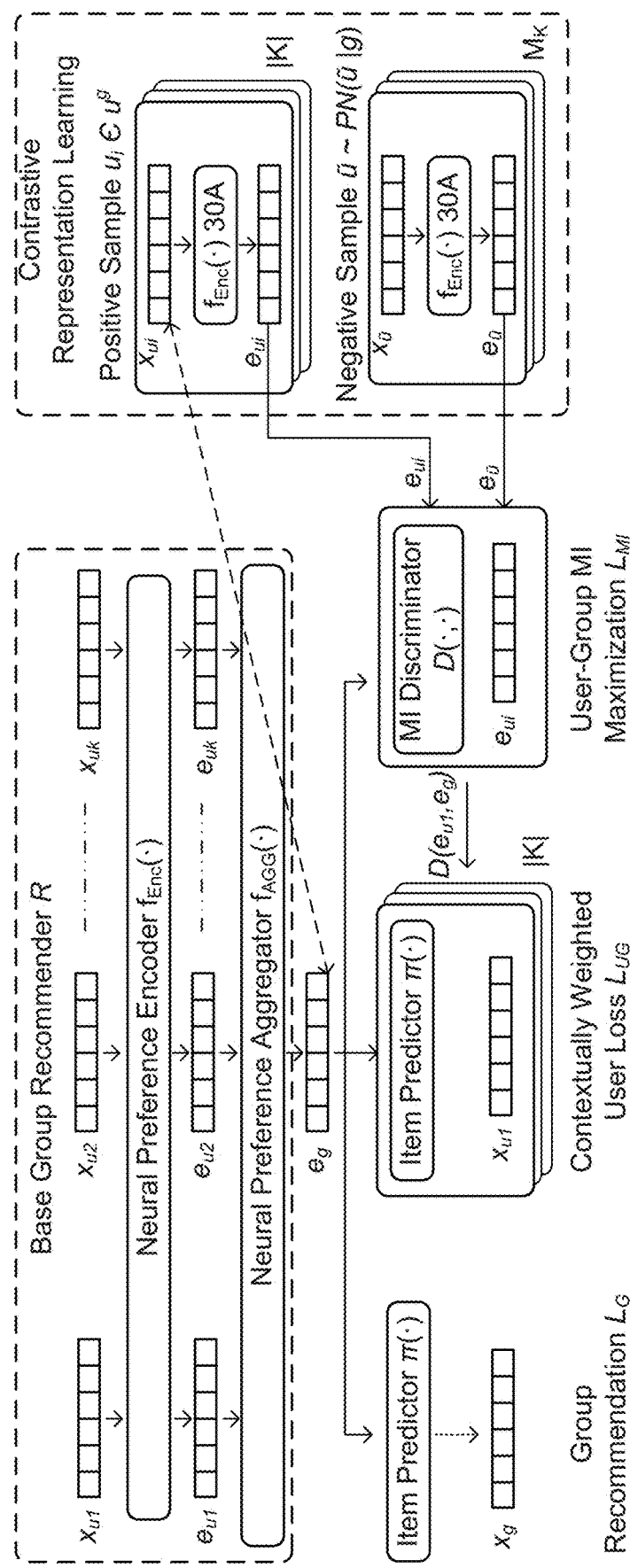
FIG. 4 is a diagram illustrating components of the neural group recommender in further detail.

FIG. 4 is a diagram illustrating components of the neural group recommender 26 in further detail. Referring to both FIG. 3A and FIG. 4, the neural group recommender 400 includes base group recommender R, which comprises a neural preference encoder $f_{ENC}(\cdot)$, a neural preference aggregator $f_{AGG}(\cdot)$, and a joint user and group interaction loss. Unifying neural group recommenders $f_{ENC}(\cdot)$ and $f_{AGG}(\cdot)$ within a single framework facilitates deeper analysis into their shortcomings in addressing ephemeral groups.

In an embodiment, the base neural group recommender R first computes user preference embeddings $E \in \mathbb{R}^{|U| \times D}$ from user-item interactions $X_U$ using neural preference encoder $f_{ENC}(\cdot)$, followed by applying the neural preference aggregator $f_{AGG}(\cdot)$ to compute the group preference embeddings $e_g$ for group g. Finally, the group embedding $e_g$ is jointly trained over the group-item interactions $X_G$ and the user-item interactions $X_U$.

User Preference Embeddings

User embeddings E constitute a latent representation of their personal preferences, indicated in the interaction matrix $X_U$. Since latent-factor collaborative filtering methods adopt a variety of strategies (such as matrix factorization, autoencoders, etc.) to learn user embeddings E, embodiments define the neural preference encoder $F_{enc}$: $|U| \times Z_2^{|I|} \to \mathbb{R}^D$ with two inputs: user u and associated binary personal preference vector $x_u$.

$$e_u = f_{ENC}(u, x_u) = \forall u \in U$$

In an embodiment, $e_u$ can be augmented with additional inputs including temporal contextual attributes, item relationships, etc. via customized encoders.

Group Preference Aggregation

In an embodiment, the neural preference aggregator models the interactions among group members to compute an aggregate feature embedding $e_g \in \mathbb{R}^D$ for ephemeral group $g \in G$. Since groups are sets of users with no specific order, in an embodiment, the class of permutation-invariant functions (such as summation or pooling operations) on sets can be used. For example, the function $f_{AGG}(.)$ is permutation-invariant to the order of objects in set $\{e_{u1}, \ldots, e_{u|g|}\}$. In an embodiment, the preference embedding $e_g$ is computed for group g using an arbitrary permutation-invariant preference aggregator $f_{AGG}(\cdot)$ as:

$$e_g = f_{AGG}(\{e_u : u \in u^g\}) = g \in G$$

Joint User and Group Loss

In an embodiment, the group preference embedding $e_g$ is trained over the observed group-item interactions $X_G$ with group-loss $L_G$. The framework supports different recommendation objectives, including pairwise and pointwise ranking losses. Here, a multinomial likelihood formulation may be used owing to its impressive results in user based neural collaborative filtering. In an embodiment, the group embedding $e_g$ is transformed by a fully connected layer and is normalized by a softmax function to produce a probability vector $\pi(e_g)$ over the item set I. In an embodiment, the loss KL-divergence between the normalized purchase history $x_g/|x_g|$ (where $|x_g|$ indicates the items interacted by group g) and predicted item probabilities $\pi(e_g)$, given by:

$$L_G = -\sum_{g \in G} \frac{1}{|x_g|} \sum_{i \in I} x_{gi} \log \pi_i(e_g); \pi(e_g) = softmax(W_I e_g)$$

In an embodiment, the multinomial likelihood formulation is used based on the impressive results that it provides in user-based neural collaborative filtering, however the framework also supports other pairwise or pointwise ranking objectives, etc. to optimize $L_G$.

In an embodiment, a user-loss $L_U$ is defined that regularize us the user embeddings E with the user-item interactions $X_U$, thus facilitating joint training with shared encoder $f_{ENC}$ and predictor ($W_I$) layers. In an embodiment, a similar multinomial likelihood-based formation can be used to optimize the user-loss, defined by:

$$L_U = -\sum_{u \in \mathcal{U}} \frac{1}{|x_u|} \sum_{i \in I} x_{ui} \log \pi_i(e_u); L_R = L_G + \lambda L_U$$

where $L_R$ denotes the overall loss of the base recommender R with balancing hyper-parameter $\lambda$.

The neural method AGREE trains an ATTENTIONal aggregator with pairwise regression loss over both $X_U$ and $X_G$, while neural method MoSAN trained a collection of sub-intentional aggregator's with Bayesian personalized ranking loss on just $X_G$. thus, state-of-the-art neural methods AGREE and MoSAN are specific instances of the framework described by the base recommender R.

Motivation

To address ephemeral groups, the present embodiments focus on regularization strategies that are independent of the base recommender R. With the rapid advances in neural methods, future enhancements can be envisioned in neural architectures for user embeddings and group preference aggregation. Since ephemeral groups by definition purchase very few items together, base recommenders suffer from inadequate training data in group interactions. Here, the group preference embedding $e_g$ receives back-propagation signals from sparse interacted items in $x_g$, thus lacking evidence to reliably estimate the role of each group member. To address group interaction sparsity towards robust ephemeral group recommendation, the disclosed embodiments provide two data-driven regularization strategies that are independent of the base recommendation mechanisms to generate individual and group preference embeddings.

Contrastive Representation Learning

It is noted that users' preferences are group-dependent; and user's occurring together in groups typically exhibit Co. varying preferences (e.g., shared cuisine taste). Thus, group activities reveal distinctions across groups (e.g., close friends versus colleagues) and latent user associations (e.g., co-occurrence of users in similar groups), that are not evident when the base recommender R only predicts sparse group interactions.

In an embodiment, the preference embeddings of group members are contrasted with those of non-member users with similar item histories, to effectively regularize the latent space of user and group preference embeddings. In an embodiment, these operations promote the preference embeddings to encode latent discriminative characteristics shared by group members that are not discernible from their limited interacted items in $X_G$.

Group-Adaptive Preference Prioritization

In an embodiment, to overcome group interaction sparsity, the disclosure critically notes that while groups are ephemeral with sparse interactions, the group members have comparatively richer individual interaction histories. Thus, it is proposed to selectively exploit the personal preferences of group members to enhance the quality of group representations.

The user-loss $L_U$ (equation 4) in base recommender R attempts to regularize user embeddings E based on their individual activities $X_U$. A key weakness is that $L_U$ forces $e_U$ to uniformly predict preferences $x_U$ across all groups containing user u. Since groups interact with items differently than individual members, inaccurately utilizing $X_U$ can become counter-productive. Fixed regularization results in degenerate models that either over-fit or are over-regularized, due to lack of flexibility in adapting preferences per group.

To overcome group interaction sparsity, embodiments contextually identify members that are highly relevant to the group and regularize the group representation to reflect their personal preferences. To measure contextual relevance, group-specific relevance weights w(u, g) are introduced for each user u where w(·) is a learned weighting function of both user and group representations. This enhances the expressive power of the recommender, thus effectively alleviating the challenges imposed by group interaction sparsity.

In the section below, ephemeral group recommendation is defined, and a base group recommender architecture is presented having three modules: user representations, group preference aggregation, and joint loss functions. Finally, the motivation is given to contrastively regularize the user-group space to capture member associations and group distinctions, and learn group-specific weights w(u, g) to regularize group embeddings with individual user preferences.

Group Mutual Information (GroupIm) Framework

Mutual Information Maximization

The user-group MI maximization approach will be introduced through an illustration. Referring again to the introductory example to illustrate how to regularize Alice's latent representation based on her interactions in two different groups. Consider Alice who first goes out for lunch to an Italian restaurant with a visitor Bob, and later dines at a Mexican restaurant with her friend Charlie. First, Alice plays different roles across the two groups (i.e., stronger influence among friends than with Bob) due to the differences in group context (visitors versus friends). Thus, we require a measure to quantify the contextual informativeness of user u in group g. Second, the embedding of Alice must capture association with both visitor Bob and friend Charlie, yet express variations in her group activities. Thus, it is necessary to not only differentiate the role of Alice across groups, but also compute appropriate preference embeddings that make her presence in each group more coherent.

To achieve these two goals at once, user-group mutual information (MI) is maximized to regularize the latent space of user and group preference embeddings, and set group-specific relevance weights w (u, g) in proportion to their estimated MI scores. User-group MI measures the contextual informativeness of a group member u towards the group decision through the reduction in group decision uncertainty when user u is included in group g. Unlike correlation measures that quantify monotonic linear associations, mutual information captures complex non-linear statistical relationships between covarying random variables. The disclosed MI maximization strategy enables the neural group recommender 400 to achieve the two-fold motivation described previously:

Altering Latent Representation Geometry: Maximizing user-group MI encourages the group embedding $e_g$ to encode preference covariance across group members, and regularizes the user embeddings E to capture social associations in group interactions.

Group-specific User Relevance: By quantifying w (u, g) through user-group mutual information, the extent of informativeness for user u in group g is accurately captured, thus guiding group-adaptive personal preference prioritization.

User-Group MI Maximization

Referring still to FIG. 4, neural MI estimation demonstrates the feasibility to maximize MI by training a classifier, such as MI discriminator D, to accurately separate positive samples drawn from their joint distribution from negative samples drawn from the product of marginals.

In an embodiment, user-group MI is maximized between group member preference embeddings $\{e_u: u \in u^g\}$ and group embedding $e_g$ (computed in [0054] [0058]). The system trains a contrastive discriminator D: $R^D \times R^D \to R^+$, where output score $D(e_u, e_g)$ represents a probability score assigned to this user-group pair (higher scores for users who are members of group g). The positive samples $(e_u, e_g)$ for D are the preference embeddings of (u, g) pairs such that $u \in u^g$, and negative samples are derived by pairing $e_g$ with the preference embeddings of non-member users sampled from a negative sampling distribution $P_N(u|g)$. The discriminator D is trained on a noise-contrastive type objective with a binary cross-entropy (BCE) loss between samples from the joint (positive pairs), and the product of marginals (negative pairs), resulting in the following objective:

$$L_{MI} = -\frac{1}{|G|}\sum_{g \in G}\frac{1}{a_g}\left[\sum_{u \in u^g}\log D_{ug} + \sum_{j=1}^{M_g}E_{\tilde{u} \sim P_N}\log(1 - D_{\tilde{u}g})\right]$$

where $\alpha_g = |g| + M_g$, $M_g$ is the number of the negative samples drawn for group g and $D_{ug}$ is shorthand for $D(e_u, e_g)$. In an embodiment, this objective maximizes MI between $e_u$ and $e_g$ based on Jensen-Shannon divergence between the joint distribution and the product of marginals. In other embodiments, the objective can amount to maximizing MI between $e_u$ and $e_g$ based on other type divergences.

In an embodiment, a preference-biased negative sampling distribution $P_N(\tilde{u}|g)$ is used, which assigns higher probabilities to non-member users who have purchased the group items $x_g$. These hard negative samples encourage the discriminator to learn latent aspects shared by group members in contrast to other users with similar personal item histories. In an embodiment, $P_N(\tilde{u}|g)$ is defined as:

$$P_N(\tilde{u} \mid g) \propto \eta I(\{x_{\tilde{u}}^T \cdot x_g > 0\}) + (1-\eta)\frac{1}{|\mathcal{U}|}$$

where I(·) is an indicator function and $\eta$ controls the bias towards non-member users sharing group items. In an embodiment, $\eta = 0.5$ can be used. In other embodiments, $\eta$ can have other values. In comparison to randomly sampled negative users, in an embodiment, experiments indicate that preference-biased negative user sampling exhibits better discriminative abilities.

In an embodiment, when $L_{MI}$ is trained jointly with the group recommendation loss $L_B$, maximizing user-group MI enhances the quality of user in group embeddings computed by the encoder $f_{ENC}(\cdot)$ and aggregator $f_{AGG}(\cdot)$.

In the next section, an approach is given to overcome the limitations of the fixed regularizer $L_U$.

Contextual User Preference Weighting

In an embodiment, a contextual weighting strategy is used to identify and prioritize personal preferences of relevant group members to overcome group interaction sparsity. Degenerate solutions are avoided by varying the extent of regularization introduced by each user preference embedding $x_u$ (for user u) across groups through group-specific relevance weights w(u, g). The contextual weighting function accounts for user participation in diverse groups with different levels of shared interests.

In an embodiment, by maximizing user-group MI, the discriminator D outputs scores $D(e_u, e_g)$ that quantify the contextual informativeness of each (u, g) pair (higher scores for informative users). Thus, the relevance weight w(u, g) can be set for group member $u \in u^g$ to be proportional to $D(e_u, e_g)$.

Figure 5:
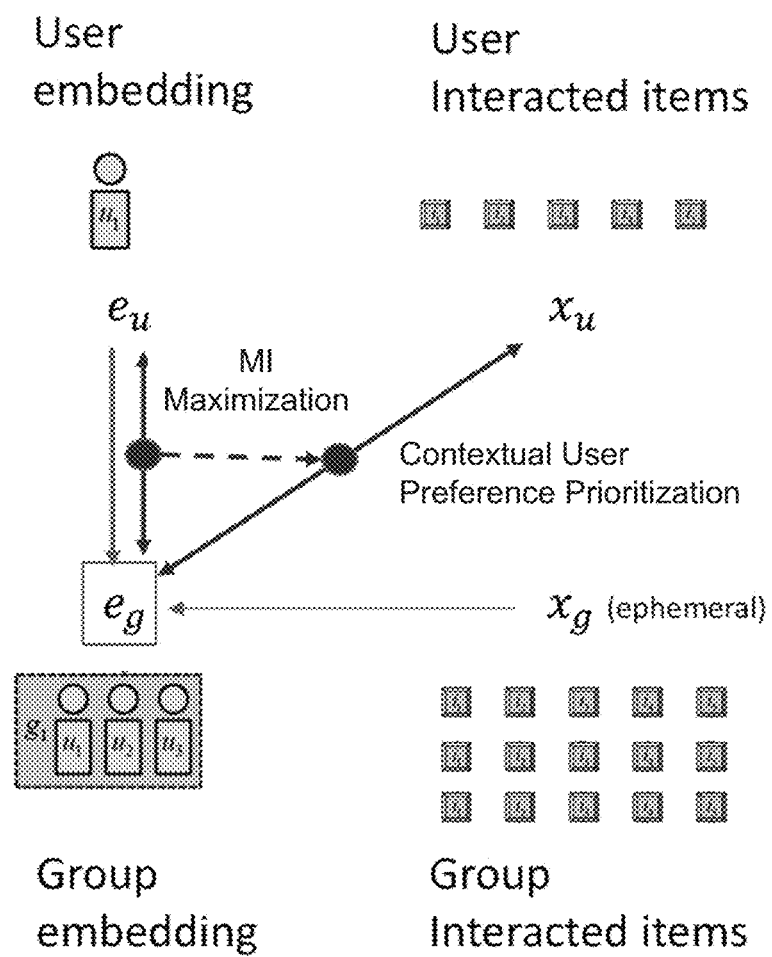
FIG. 5 illustrates particular portions of FIG. 4 in further detail.

As shown graphically represented by dashed arrow in FIG. 4 as well as in FIG. 5 illustrating portions of FIG. 4 in further detail, instead of regularizing the user embeddings E with $x_u$ in each group, the group embedding $e_g$ is directly regularized with $x_u$ in proportion to $D(e_u, e_g)$ for each member u. In an embodiment, direct optimization of $e_g$ (instead of $e_u$) results in more effective and direct regularization, especially with sparse group activities. Thus, in an embodiment, the contextually prioritized user-loss $L_{UG}$ can be defined as:

$$L_{UG} = -\sum_{g \in G} \frac{1}{|x_g|} \sum_{i \in I} \sum_{u \in u^g} D(e_u, e_g) x_{ui} \log \pi_i(e_g)$$

In an embodiment, $L_{UG}$ effectively encourages $e_g$ to learn the personal activities of user $u \in u_g$ with contextual weight determined by $D(e_u, e_g)$. In an embodiment, the scores given by D are utilized for contextual weighting, while D is kept fixed when optimizing $L_{UG}$.

Model Details

The architectural details of neural preference encoder $f_{ENC}(\cdot)$, aggregator $f_{AGG}(\cdot)$, discriminator D and an alternative optimization approach to train the groupIM framework is described.

Referring to the neural preference encoder, to encode users' individual preferences $X_U$ into preference embeddings E, a multi-layer perceptron with two fully connected layers can be used that is defined by:

$$e_u = f_{ENC}(x_u) = \sigma(W_2^T(\sigma W_1^T x_u + b_1) + b_2)$$

with learnable weight matrices $W_1 \times \in R^{|I| \times D}$ and $W_2 \in R^{D \times D}$, biases b1, b2 $\in R^D$ and tanh($\cdot$) activations for non-linearity $\sigma$.

In an embodiment, the weights and biases of the first layer ($W_1$, $b_1$) can be pretrained on the user-item interaction matrix $X_U$ with reconstruction loss $L_U$. In an embodiment, these parameters can be used to initialize the first layer of fenc($\cdot$) before training system 100. According to ablation studies described further below, such as initialization strategy provides significant improvements.

Group Preference Aggregators

In an embodiment, preference aggregators can include but are not limited to Maxpool, Meanpool and ATTENTION, which are widely used for neighborhood aggregation in graph neural networks and have close ties to preference aggregators examined in existing group recommendation studies. Maxpool and Meanpool mirror the heuristics of maximum satisfaction and averaging albeit in the latent space, while ATTENTIONs learn group member preferences in recent neural methods. In an embodiment, the aggregators are defined below:

In an embodiment, the Maxpool aggregator passes the preference embedding of each member through MLP layers, followed by an element-wise max-pooling operation to aggregate the preference representations of group members, given by:

$$e_g = \max(\{\sigma(W_{agg} e_u + b), = u \in u_g\})$$

where max denotes the element-wise max operator and $\sigma(.)$ is a nonlinear activation function. Intuitively, the MLP layers compute features for each group member, and applying maxpooling to each of the computed features effectively captures different aspects of group members.

In an embodiment, Meanpool applies an element-wise mean-pooling operation can the MLP layers to compute group representation $e_g$ as:

$$e_g = \text{mean}(\{\sigma(W_{agg} e_u + b), \forall u \in u_g\}$$

In an embodiment, neural ATTENTIONs are used to compute a weighted sum of members' preference representations to explicitly differentiate group members' roles, where the weights are learned by an ATTENTION network, parameterized by a single MLP layer.

$$e_g = \sum_{u \in u_g} \alpha_u W_{AGG} e_u a_u = \frac{\exp(h^T W_{AGG} e_u)}{\sum_{u' \in u_g} \exp(h^T W_{AGG} e_{u'})}$$

where $\alpha_u$ indicates the contribution of a user u towards the group decision. This formulation can be readily extended to include item-conditioned weighting or a collection of sub-ATTENTION networks.

In an embodiment, the discriminator architecture learns a scoring function to assign higher scores to observed (u, g) pairs relative to negative examples, thus parameterizing group specific relevance w(u, g). In an embodiment, the discriminator D scores user-group representation pairs through a bilinear function:

$$D(e_u, e_g) = \sigma(e_u^T W e_g)$$

where W is a learnable scoring matrix and $\sigma$ is the logistic sigmoid non-linearity function to convert raw scores into probabilities of ($e_u$, $e_g$) being a positive example.

In an embodiment, as regards model optimization, the combined objective of groupIM is achieved with three terms, the group-loss ($L_G$) value, the user-group MI maximization ($L_{MI}$), and the contextually weighted user loss ($L_{UG}$). The combined objective is given as:

$$L = \underbrace{L_G}_{\text{Group Recommendation Loss}} + \underbrace{\lambda L_{UG}}_{\text{Contextually Weighted User Loss}} + \underbrace{L_{MI}}_{\text{User-Group MI Maximization Loss}}$$

In an embodiment, the groupIM is trained using an alternating optimization schedule. In the first operation, the discriminator D is held constant, while optimizing the base group recommender on $L_G + \lambda L_{UG}$. In an embodiment, the second operation trains D on $L_{MI}$, resulting in gradient updates for both parameters of D as well as neural preference encoder $f_{ENC}(\cdot)$ and aggregator $f_{AGG}(\cdot)$.

Thus, the discriminator D only seeks to regularize the model (i.e., encoder and aggregator) during training through loss terms $L_{MI}$ and $L_{UG}$. During inference, the regularized encoder $f_{ENC}(\cdot)$ and aggregator $f_{AGG}(\cdot)$ are directly used to make group recommendations.

Example Experiments

Datasets

First, example experiments were conducted on large-scale POI (Point-of-interest) recommendation datasets extracted from three location-based social networks. Since the POI datasets do not contain explicit group interactions, group interactions were constructed by jointly using the check-ins and social network information: check-ins at the same POI within a span of 15 minutes by groups of friends in the social network together constitute a single group interaction, while remaining check-ins at the POI correspond to individual interactions. The group recommendation task is defined as a recommending POIs to ephemeral groups of users. The datasets were pre-processed to retain users and items that have five or more check-ins each. Descriptions of each dataset are presented below:

Weeplaces: check-ins are extracted on POIs over all major cities in the United States, across various categories including Food, Nightlife, Outdoors, Entertainment and Travel.

Yelp: the entire dataset is filtered to only include check-ins on restaurants located in the city of Los Angeles.

Gowalla: restaurant check-ins across all cities in the United States are used, in the time period up to June 2011.

Second, we evaluated venue recommendation on Douban, which is the largest online event-based social network in China. Douban users organize and participate in social events, where users attend events together in groups and items correspond to event venues. During pre-processing, users and venues with less than 10 interactions each are filtered out.

FIG. 6 illustrates a table showing statistics of datasets used in example experiments. Groups across all datasets are ephemeral since group interactions are sparse. In particular, FIG. 6 shows that the average number of items per group is less than 3.5.

Baselines

The framework approach herein describes was compared against state-of-the-art baselines that broadly fall into two categories: (a) score aggregation methods with predefined aggregators, and (b) data-driven preference aggregators.

Popularity: recommends items based on item popularity, which is measured by its interaction count in the training set.

User-based CF+Score Aggregation: personalized recommendation lists are first generated according to an embodiment, using a state-of-the-art neural collaborative filtering method VAE-CF. A state-of-the-art neural recommendation model VAE-CF was used, followed by score aggregation via: averaging (AVG), least-misery (LM), maximum satisfaction (MAX), and relevance-disagreement (RD).

COM: a probabilistic generative model that determines group decisions based on group members' (a) individual item preferences and (b) their topic-dependent influence.

CrowdRec: a generative model that extends COM through item-specific latent variables capturing their global popularity.

MoSAN: a neural group recommender that employs a collection of sub-ATTENTIONal networks to model group member interactions. Since MoSAN originally ignores individual activities $X_U$, $X_U$ is included into $X_G$ as pseudo-groups with single users.

AGREE: a neural group recommender that utilizes ATTENTIONal preference aggregation to compute item-specific group member weights, for joint training over personal and group activities.

GroupIM was tested by substituting three preference aggregators, Maxpool, Meanpool and ATTENTION. All experiments were conducted on a single Nvidia™ Tesla™ V100 GPU with PyTorch implementations on the Linux platform.

Experimental Setup

In an example setup the set of all groups are randomly split into training (70%), validation (10%) and test (20%) sets, while utilizing the individual interactions of all users for training. Note that each group appears only in one of the three sets. The test set contains strict ephemeral groups (i.e., a specific combination of users) that do not occur in the training set. Thus, we train on ephemeral groups and test on strict ephemeral groups. NDCG@K and Recall@K are used as metrics to evaluate group recommendation performance.

We tune the latent embedding dimension in the range {32, 64, 128} and other baseline hyper-parameters in ranges centered at author-provided values. In GroupIM, we use two fully connected layers of size 64 each in $f_{enc}(\ )$ and tune $\lambda$ in the {range 2-4, 2-3, ..., $2^6$}. We use 5 negatives for each true user-group pair to train the discriminator.

Experimental Results

FIG. 7 illustrate a Table showing group recommendation results on the four datasets, where R@K and N@K denote the Recall@K and NDCG@K metrics at K=20 and 50. The GroupIM variants indicate maxpool, meanpool, and ATTENTION as preference aggregators in our MI maximization framework. GroupIM achieves significant gains of 31 to 62% NDCG@20 and 3 to 28% Recall@20 over competing group recommenders. Notice that meanpool and ATTENTION variants achieve comparable performance across all datasets.

The following are key observations from our experimental results comparing GroupIM with its three aggregator variants, against baselines on group recommendation. First, heuristic score aggregation with neural base recommenders (such as VAE-CF) performs comparable to (and often outperform) conventional probabilistic models (e.g., COM, Crowdrec). Neural methods with multiple non-linear transformations of preference embeddings, are expressive enough to identify latent groups of similar users just from their individual interactions.

Second, there is no clear winner among the different pre-defined score aggregation strategies, e.g., VAE-CF+LM (least misery) outperforms the rest on Gowalla and Douban, while VAE-CF+LM (averaging) is superior on Yelp and Weeplaces. This empirically validates the non-existence of a single optimal strategy for all datasets. Third, MoSAN outperforms both probabilistic models and fixed score aggregators on most datasets. MoSAN achieves stronger results owing to the expressive power of neural preference aggregators (such as sub-ATTENTION networks) to capture group member interactions, albeit not explicitly differentiating personal and group activities. Also, note that naive joint training over personal and group activities via static regularization (as in AGREE) results in poor performance due to sparsity in group interactions. Static regularizers on $X_U$ cannot distinguish the role of users across groups, resulting in models that lack generalization to ephemeral groups.

GroupIM variants was found to outperform all baselines by significant margins, with the ATTENTION variant achieving overall best results. In contrast to a neural methods (i.e., MoSAN and AGREE), GroupIM regularizes the latent embeddings by contextually weighting the personal preference of informative group members. The maxpool variant is noticeably inferior, due to the relatively higher sensitivity of max operation to outlier group members.

It should be noted that GroupIM-Meanpool often performs comparably to the ATTENTION variant. In GroupIM, the discriminator D does the heavy-lifting of contextually differentiating the role of users across groups to effectively regular lies the encoder $f_{ENC}(\cdot)$ and aggregator $f_{AGG}(\cdot)$ modules. Assuming $f_{ENC}(\cdot)$ and D are expressive enough to, efficient meanpool aggregation can achieve state-of the-art results, as evidenced in FIG. 7.

An important implication is the reduced inference complexity of the model of an embodiment, i.e., once trained using the MI maximizing framework, simple aggregators (such as meanpool) suffice to achieve state-of the-art performance. This is especially significant, considering that the closest baseline MoSAN utilizes sub-ATTENTIONal preference aggregation networks that scale quadratically with group size.

Figure 8:
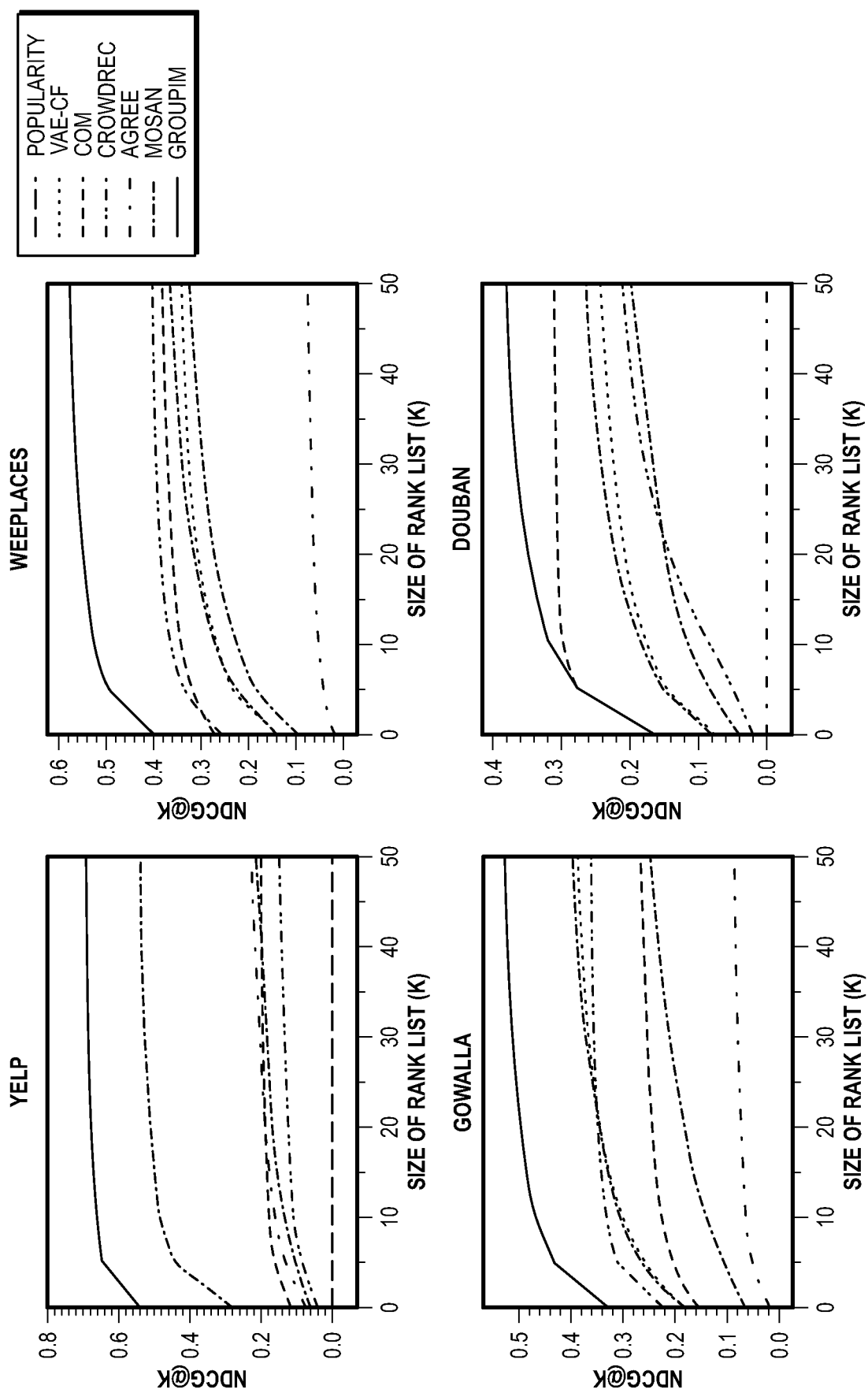
FIG. 8 illustrates graphs comparing the variation in NDCG scores with size of rank list K (1 to 50).

FIG. 8 illustrates graphs comparing the variation in NDCG scores with size of rank list K (1 to 50). Variance bands indicate 95% confidence intervals over 10 random runs. GroupIM contextually identifies informative members and regularizes their representations, to show strong gains. We only depict the best aggregator for VAE-CF. GroupIM consistently generates more precise recommendations across all datasets. We observe smaller gains in Douban, where the user-item interactions exhibit substantial correlation with corresponding group activities. Existing methods underperform since they either disregard member roles (VAE-CF variants) or overfit to the sparse group activities GroupIM achieves significant gains in characterizing diverse groups, evidenced further below.

Model Analysis

In this section, an ablation study is presented to analyze several variants of GroupIM. In our experiments, ATTENTION is used as the preference aggregator due to its consistently high performance. Studies were conducted on Weeplaces and Gowalla, to report NDCG@50 and Recall@50 in the Table of FIG. 9.

FIG. 9 illustrates a Table showing results of a GroupIM ablation study (NDCG and Recall at K=50). Contrastive representation learning (row 3) improves the base recommender (row 1), but is substantially more effective with group-adaptive preference weighting (row 7).

First, we examined the base group recommender R, which does not utilize MI maximization for model training as shown in the Table of FIG. 9.

Base Group Recommender. Two variants of the base recommender R are examined below: (1) R is trained on just group activities $X_G$ with loss $L_G$. (2) R is trained jointly on individual ($X_U$) and group ($X_G$) activities with static regularization on $X_U$ with loss $L_R$. In comparison to similar neural aggregator MoSAN, our base recommender R is stronger on NDCG but may not be stronger on Recall. The difference is likely due to the multinomial likelihood used to train R, in contrast to the ranking loss in MoSAN. Static regularization via $X_U$ (1) results in higher gains for Gowalla (richer user-item interactions) with relatively larger margins for Recall than NDCG.

Next, model variants of GroupIM are examined in two parts.

GroupIM: Contrastive representation Learning. The gains introduced by just training the contrastive discriminator D are analyzed to capture group membership associations, i.e., model variant (row 3) is defined to optimize just just $L_G+L_{MI}$, without the $L_{UG}$ term. Direct MI maximization (row 3) improves over the base recommender R (row 1), validating the benefits of contrastive regularization, however, still suffers from the lack of user preference prioritization.

GroupIM: Group-adaptive preference prioritization. The benefits of a data-driven contextual weighting (via a user-group MI) are analyzed by examining two alternate fixed strategies are examined to define w(u, g); (row 4) Uniform weights: the same weight w(u, g)=1 is assigned for each group member u in group g, when optimizing $L_{UG}$. (row 5) Cosine similarity: To model user-group correlation, we set the weight w(u, g) as the cosine similarity between $x_u$ and $x_g$. From table (row 4) and (row 5), the uniformly weighted variant of loss $L_{UG}$ (row 4) surpasses the statically regularized model (2), due to more direct feedback from $X_u$ to group embedding $e_g$ during model training. Cosine similarity (row 5) achieves stronger gains owing to more accurate correlation-guided user weighting across groups. Our model GroupIM (row 7) has strong gains over the variants as a result of its regulation strategy to contextually identify informative members across groups.

GroupIM: Pre-training $f_{enc}$ on $X_U$. We depict model performance without pre-training (random initializations) in row 6. Our model (row 7) achieves noticeable gains; pre-training identifies good model initialization points for better convergence.

Impact of Group Characteristics

In this section, the results are examined to understand the reason for GroupIM's gains. In particular, we study ephemeral groups along three facets (a) group size, (b) group coherence, and (c) group aggregate diversity.

Group Size.

Figure 10:
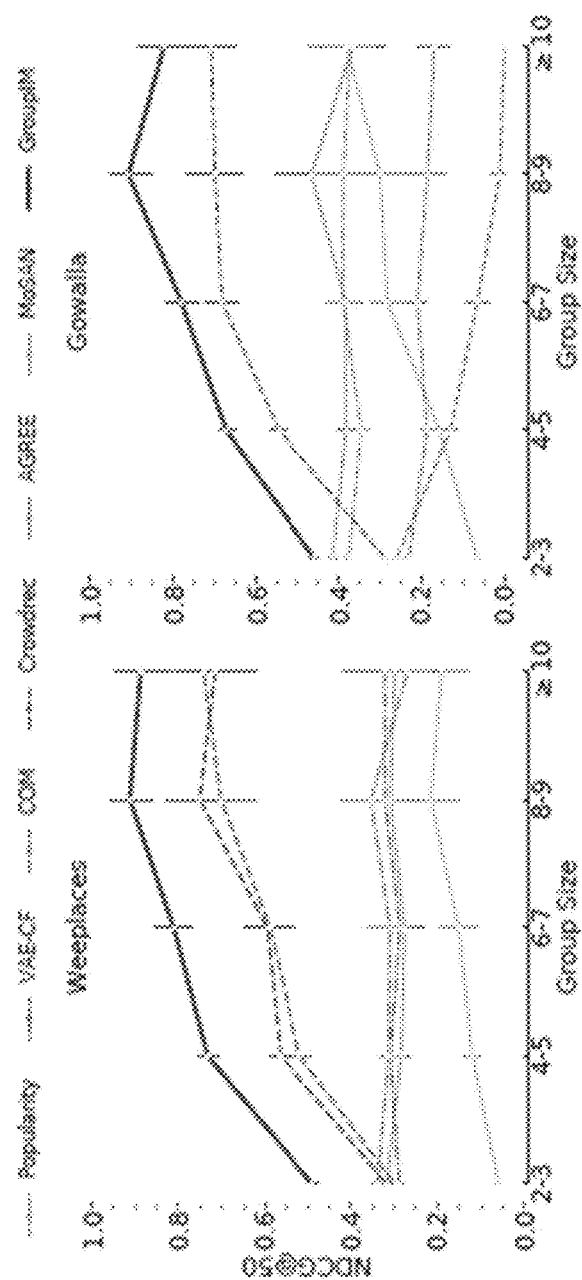
FIG. 10 depicts the variation in NDCG@50 scores on Weeplaces and Gowalla data sets.

FIG. 10 depicts the variation in NDCG@50 scores on Weeplaces and Gowalla data sets. Test groups are classified into bins based on 5 levels of group size (2-3, 4-5, 6-7, 8-9, and ≥10). GroupIM has larger gains for larger groups due to accurate user associations learnt via MI maximization. Three observations are made: (a) Methods that explicitly distinguish personal and group activities (such as COM, CrowdRec, GroupIM), exhibit distinct trends with regard to group size. In contrast, MoSAN and AGREE, which either mix both behaviors or apply static regularizers, show no noticeable variation, performance generally increases with group size. Although test groups are previously unseen, larger groups have higher chances to have observed subsets of inter-member interactions during training, thus resulting in better performance. GroupIM achieves higher (or steady) gains for groups of larger sizes owing to its accurate prioritization of personal preferences for each member, e.g., GroupIM clearly has stronger improvements for groups of sizes 8-9 and ≥10 in Gowalla.

Group Coherence

Group coherence is defined as the mean pair-wise correlation of personal activities ($x_u$) of group members, i.e., if a group has users who frequently co-purchase items, it receives greater coherence.

Figure 11:
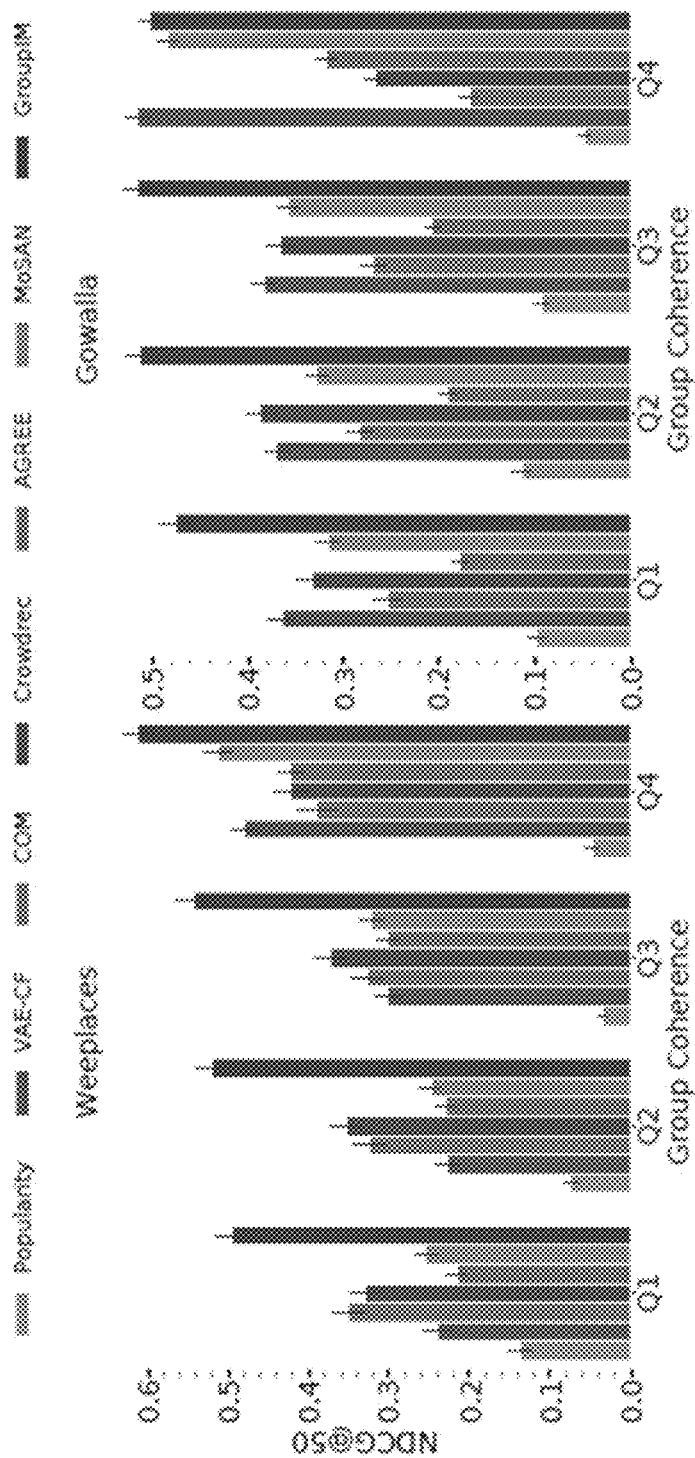
FIG. 11 illustrates charts of the performance (NDCG@50) achieved by all models for groups under each quartile (Q1:lowest, Q4:highest), on Weeplaces and Gowalla.

FIG. 11 illustrates charts of the performance (NDCG@50) achieved by all models for groups under each quartile (Q1:lowest, Q4:highest), on Weeplaces and Gowalla. Test groups are separated into 4 quartiles by their coherence scores. GroupIM has stronger gains for groups with low coherence (quartiles Q1 and Q2), which empirically validates the efficacy of contextual user preference weighting in regularizing the encoder and aggregator, for groups with dissimilar member preferences.

Group Aggregate Diversity

The classical aggregate diversity metric is adapted to define group aggregate diversity as the total number of distinct items interacted across all members of a group, i.e., if the set of all purchases of group members covers a wider range of items, then the group has higher aggregate diversity.

Figure 12:
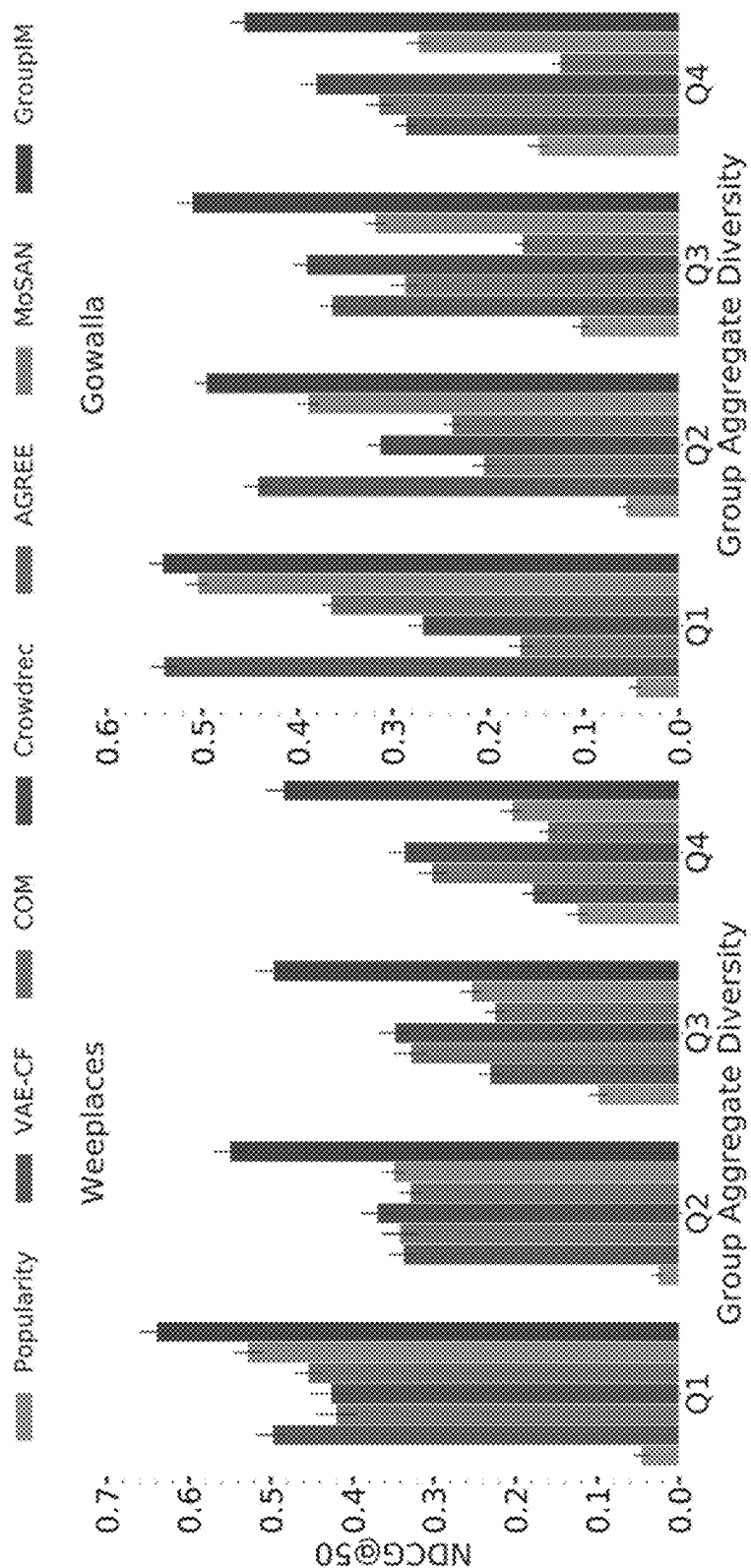
FIG. 12 show charts Performance (NDCG@50), across group aggregate diversity quartiles (Q1: lowest, Q4: highest).

FIG. 12 show charts Performance (NDCG@50), across group aggregate diversity quartiles (Q1: lowest, Q4: highest). GroupIM has larger gains in Q3 & Q4 (high diversity). Model performance typically decays (and stabilize), with increase in aggregate diversity. Diverse groups with large candidate item sets, pose an information overload for group recommenders, leading to worse results. Contextual prioritization with contrastive learning, benefits diverse groups, as evidenced by the higher relative gains of GroupIM for diverse groups (quartiles Q3 and Q4).

Figure 13:
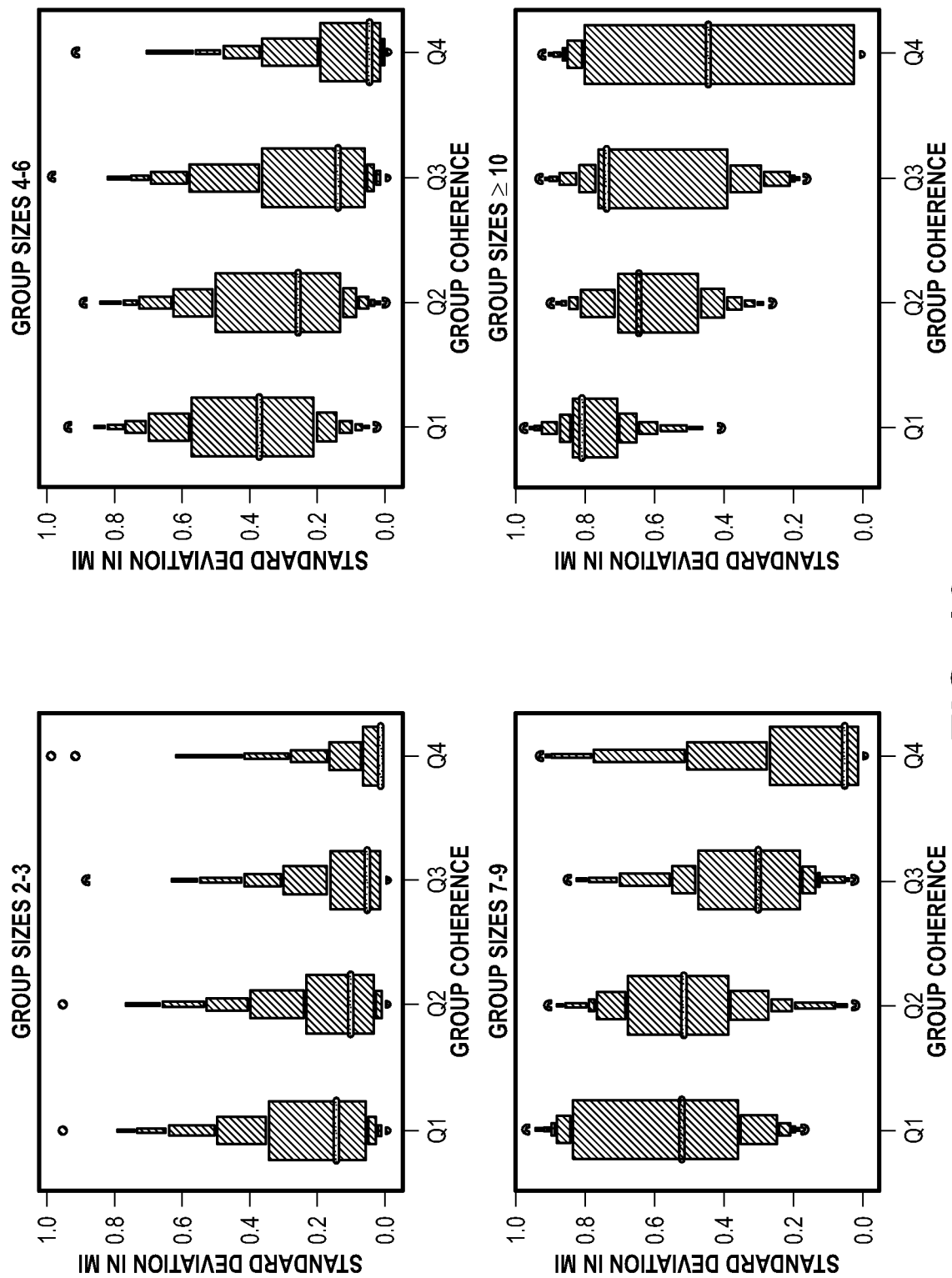
FIG. 13 show charts of MI variation (std. deviation in discriminator scores over members) per group coherence quartile across group sizes.

FIG. 13 show charts of MI variation (std. deviation in discriminator scores over members) per group coherence quartile across group sizes. For groups of a given size, as coherence increases, MI variation decreases. The test groups are again divided into 4 quartiles based on their aggregate diversity scores, to compare all models. As groups increase in size, MI variation increases.

Qualitative MI Discriminator Analysis

The contextual weights w (u, g) estimated by GroupIM are examined over test ephemeral groups, across group size and coherence.

GroupIM employs a contrastive discriminator D to flexibly weight user-group pairs based on their preference embeddings. Although a precise interpretation of the structure learned by D requires domain knowledge about the dataset under study, we examine (u, g) scores given by D to provide intuitions into its working mechanism.

FIG. 10 depicts letter-value plots of MI variation for groups in corresponding coherence quartiles, across different size ranges, on Weeplaces. Groups are divided into 4 bins based on group size ranges (2-3, 4-6, 7-9, ≥10), and partitioned into quartiles based on group coherence within each bin. To analyze the variation in contextual relevance scores assigned by D across group members, MI variation is computed, as the standard deviation of scores given by D over group members.

MI variation increases with group size, since larger groups often comprise users with divergent roles and interests. Thus, the discriminator generalizes to unseen groups, to discern and estimate markedly different relevance scores for each group member. To further examine the intuition conveyed by the scores, we compare MI variation across group coherence quartiles within each size-range.

MI variation is negatively correlated with group coherence for groups of similar sizes, e.g., MI variation is consistently higher for groups with low coherence (quartiles Q1 and Q2). For highly coherent groups (quartile Q4), D assigns comparable scores across all members, which is consistent with our intuitions and earlier results on the efficacy of averaging strategies for such groups.

We also analyzed parameter sensitivity to user-preference weight $\lambda$. Varying $\lambda$ results in overfitting to the group activities $X_G$, while substantially larger values result in degenerate solutions that lack group distinctions. Despite learning to contextually prioritize users' preferences across groups, the hyperparameter $\lambda$ controls the overall strength of prioritization. Although our experiments indicate performance stability around a broad range of $\lambda$ values, the optimal value of $\lambda$ varies across datasets and application domains. Meta-learning approaches may be used to eliminate such hyper-parameter tuning.

The disclosed embodiments provide a recommender architecture-agnostic framework GroupIM that integrates arbitrary neural preference encoders. and aggregators for ephemeral group recommendation. To overcome group interaction sparsity, GroupIM regularizes the user-group embedding space by maximizing user-group MI to contrastively capture preference covariance among group members. Unlike prior work that incorporate individual preferences through static regularizers, we dynamically prioritize the preferences of informative members through MI-guided contextual preference weighting. Our extensive experiments on four real-world datasets show significant gains for GroupIM over state-of-the-art methods.

Figure 14:
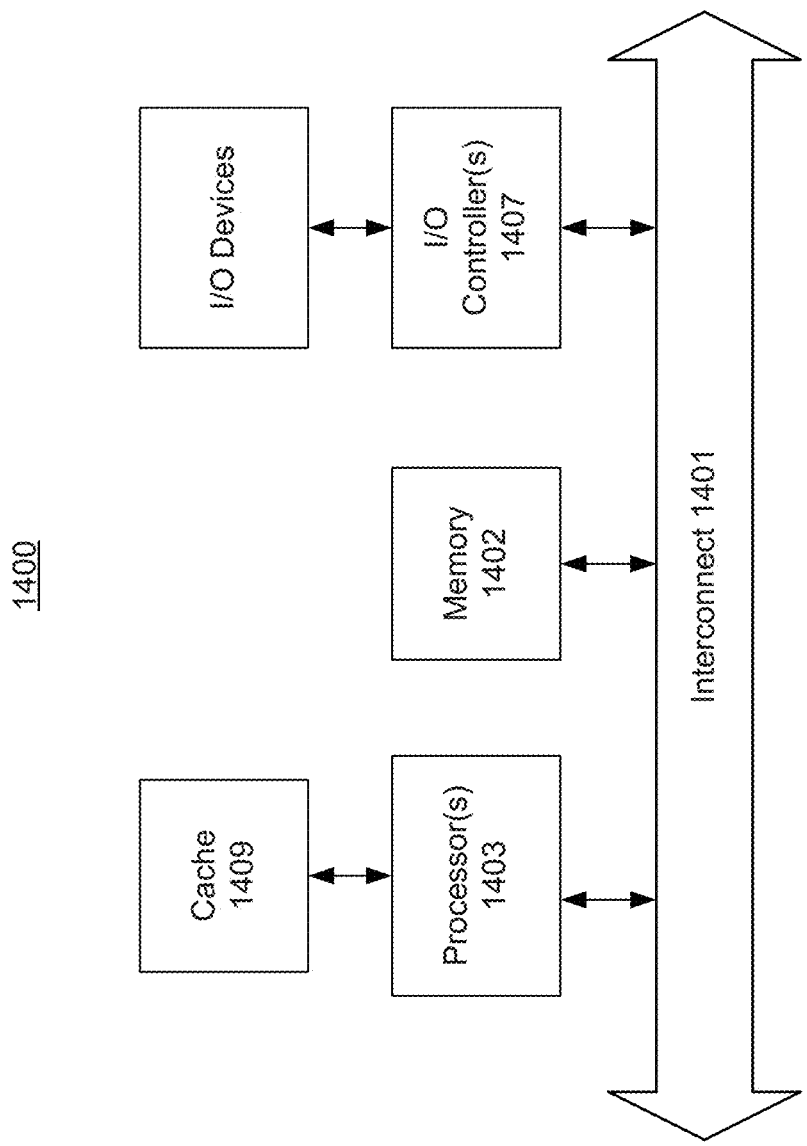
FIG. 14 shows a computer system according to an embodiment.

FIG. 14 shows a computer system (1400) according to an embodiment. The computer system 1400 can include a microprocessor(s)(1403) and memory (1402). In an embodiment, the microprocessor(s) (1403) and memory (1402) can be connected by an interconnect (1401) (e.g., bus and system core logic). In addition, the microprocessor (1403) can be coupled to cache memory (1409). In an embodiment, the interconnect (1401) can connect the microprocessor(s) (1403) and the memory (1402) to input/output (I/O) device(s) (1405) via I/O controller(s) (1407). I/O devices (1405) can include a display device and/or peripheral devices, such as mice, keyboards, modems, network interfaces, printers, scanners, video cameras and other devices known in the art. In an embodiment, (e.g., when the data processing system is a server system) some of the I/O devices (1405), such as printers, scanners, mice, and/or keyboards, can be optional.

In an embodiment, the interconnect (1401) can include one or more buses connected to one another through various bridges, controllers and/or adapters. In one embodiment, the I/O controllers (1407) can include a USB (Universal Serial Bus) adapter for controlling USB peripherals, and/or an IEEE-1394 bus adapter for controlling IEEE-1394 peripherals.

In an embodiment, the memory (1202) can include one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DV D RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In an embodiment, one or more of the elements, processes, components and/or devices of the system 10 may be integrated, separated, re-arranged, omitted, eliminated and/or implemented in other manners. In an embodiment, the components of system 10 can be implemented using hardware, software, firmware and/or any combination thereof. In particular, components of system 10 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). In an embodiment, as regards software and/or firmware implementation of the system 10, at least one of the components of such is/are hereby expressly defined to include a non-transitory computer readable storage device or storage disk such as a memory, a digital versatile disk (DVD), a compact disk (CD), a Blu-ray disk, etc. including the software and/or firmware. It should be appreciated that, the example system 10 can include one or more elements, processes and/or devices in addition to, or instead of, those illustrated in FIGS. 1 and 14, and/or may include more than one of any or all of the illustrated elements, processes and devices.

Flowcharts of the methods of for performing the operations of the system 10 are described. In an embodiment, the operations can correspond to machine readable instructions of a program that can be executed by a processor of a computer system 1400. In some embodiments, the program and/or portions or parts thereof can be executed by a device other than a processor. The program can be stored on a non-transitory machine or computer readable storage medium such as a hard drive, a digital versatile disk (DVD), a read-only memory, a compact disk, a floppy disk, a Blu-ray disk, a cache, a random-access memory or other storage device. As used herein, the term non-transitory computer readable medium is intended to refer to computer readable storage devices and/or storage disks and to exclude propagating signals and to exclude transmission media. In some embodiments, the program can be embodied in firmware or dedicated hardware. In an embodiment, one or more of the operations of the flowchart can be performed without executing software or firmware. For example, one or more of the blocks may be implemented by one or more hardware circuits such as a Field Programmable Gate Array (FPGA), an Application Specific Integrated circuit (ASIC), a discrete and/or integrated analog and/or digital circuit, a comparator, an operational-amplifier (op-amp), a logic circuit, etc. It should be noted that the order of execution of the blocks of the flowcharts may be changed. In addition, one or more of the blocks of the flowcharts can be eliminated or added.

The present invention has been described in accordance with the embodiments shown, and there could be variations to the embodiments, and any variations would be within the spirit and scope of the present invention. Accordingly, many modifications may be made by one of ordinary skill in the art without departing from the spirit and scope of the appended claims.

We claim:

1. A computer-implemented method of training embedding neural networks of a base group recommender to provide item recommendations for ephemeral groups of group members, the ephemeral groups having group interaction sparsity, the method comprising:
   providing a neural preference encoder to generate user preference embeddings from individual user-item interactions extracted from payment transaction records stored in a transaction database;
   providing a neural preference aggregator to aggregate the user preference embeddings into group preference embeddings, wherein the user preference embeddings and the group preference embeddings form a latent user-group latent embedding space; and
   training the neural preference encoder and the neural preference aggregator by regularizing the latent user-group embedding space to overcome the group interaction sparsity by:
   i) training a discriminator to maximize user-group mutual information (MI) between the group preference embeddings and the user preference embeddings of the group members so that the group preference embeddings encode shared group member preferences, while regularizing the user preference embeddings to capture user social associations, and
   ii) contextually identifying informative group members and regularizing the corresponding group preference embeddings using a contextually weighted user loss ($L_{UG}$) value based at least in part on the output of the discriminator to contextually weight users' personal preferences in each group in proportion to their user-group MI to reflect personal preferences of the identified informative group members.

2. The method of claim 1, wherein training the neural preference encoder and the neural preference aggregator further comprises: configuring the training process to train arbitrary types neural preference encoders and aggregators for ephemeral group recommendation to provide a recommender architecture-agnostic framework.

3. The method of claim 1, wherein training the neural preference encoder and the neural preference aggregator further comprises: accessing the payment transaction records from the transaction database and extracting user, group, and item information including a training user set U and a training group set G, and for each user and group, determine individual user-item interactions $x_u$ and individual group-item interactions $x_g$, respectively.

4. The method of claim 3, further comprising: training the neural preference encoder, the neural preference aggregator, and learnable weights W used therein, on the individual user-item interactions $x_u$ to generate user preference embeddings $e_u$ and group preference embeddings $e_g$, respectively, using a group loss ($L_G$) value, a user-group mutual information (MI) maximization ($L_{MI}$) value and a contextually weighted user loss ($L_{UG}$) value.

5. The method of claim 4, wherein training the neural preference encoder and the neural preference aggregator further comprises: saving for each of the groups the group preference embedding $e_g$ and the individual group-item interactions $x_g$ as a feature pair in a feature database.

6. The method of claim 5, wherein the neural preference encoder and the neural preference aggregator comprise components a neural group recommender, the method further comprising: operating the neural group recommender in an operational mode comprising:

receiving user, group, and item information, including a user set U* and a group set G*, and for each user determining individual user-item interactions $x_u^*$;

using the neural preference encoder to predict user preference embeddings $e_u^*$ based on the individual user-item interactions $x_u^*$; using the neural preference aggregator to aggregate the user preference embeddings $e_u^*$ into group preference embeddings $e_g^*$;

retrieving from the feature database, by the neural group recommender, the feature pair having the group preference embedding $e_g$ that is most similar to the group preference embeddings $e_g^*$ and setting the individual group-item interactions $x_g^*$ equal to the individual group-item interactions $x_g$ from the feature pair; and sending the individual group-item interactions $x_g^*$ to a user of group gas the ranked list of items.

7. The method of claim 4, further comprising: using the user-group MI to measure contextual informativeness of a group member u towards the group decision through the reduction in group decision uncertainty when user u is included in group g.

8. The method of claim 7, further comprising: training the discriminator D to accurately separate positive samples drawn from a joint distribution from negative samples drawn from the product of marginals.

9. The method of claim 8, further comprising: using as the positive samples $(e_u, e_g)$ for D the preference embeddings of (u, g) pairs such that $u \in u^g$, and deriving the negative samples by pairing $e_g$ with the preference embeddings of non-member users sampled from a negative sampling distribution, wherein the negative sample encourage the discriminator to learn latent aspects shared by group members in contrast to other users with similar personal item histories.

10. The method of claim 8, further comprising: outputting, by the discriminator, a probability score $D(e_u, e_g)$ assigned to user-group pairs, where $e_u$ representing user preference embeddings and $e_g$ representing group preference embeddings, where a higher score is assigned for users who are members of the group.

11. A neural group recommender system, comprising:

a transaction database storing payment transaction records;

a processor having access to the transaction database; and a software component executed by the processor, the software component comprising:

a neural preference encoder to generate user preference embeddings from individual user-item interactions extracted from payment transaction records stored in a transaction database;

a neural preference aggregator to aggregate the user preference embeddings into group preference embeddings, wherein the user preference embeddings and the group preference embeddings form a latent user-group latent embedding space;

wherein the software component is configured to train the neural preference encoder and the neural preference aggregator by regularizing the latent user-group embedding space to overcome the group interaction sparsity by:

i) training a discriminator to maximize user-group mutual information (MI) between the group preference embeddings and the user preference embeddings of the group members so that the group preference embeddings encode shared group member preferences, while regularizing the user preference embeddings to capture user social associations, and ii) contextually identifying informative group members and regularizing the corresponding group preference embeddings using a contextually weighted user loss (LUG) value based at least in part on the output of the discriminator to contextually weight users' personal preferences in each group in proportion to their user-group MI to reflect personal preferences of the identified informative group members.

12. The neural group recommender system of claim 11, wherein the training is for configured to train arbitrary types neural preference encoders and aggregators for ephemeral group recommendation to provide a recommender architecture-agnostic framework.

13. The neural group recommender system of claim 11, wherein the payment transaction records are accessed from the transaction database to extract user, group, and item information including a training user set U and a training group set G, and for each user and group, determine individual user-item interactions $x_u$ and individual group-item interactions $x_g$, respectively.

14. The neural group recommender system of claim 13, wherein the neural preference encoder, the neural preference aggregator, and learnable weights W used therein, are trained on the individual user-item interactions $x_u$ to generate user preference embeddings $e_u$ and group preference embeddings $e_g$, respectively, using a group loss ($L_G$) value, a user-group mutual information (MI) maximization ($L_{MI}$) value and a contextually weighted user loss ($L_{UG}$) value.

15. The neural group recommender system of claim 14, wherein the group preference embedding $e_g$ and the individual group-item interactions $x_g$ as a feature pair in a feature database for each of the groups.

16. The neural group recommender system of claim 15, wherein the neural preference encoder and the neural preference aggregator comprise components a neural group recommender, the neural group recommender system operating in an operational mode to:

receive user, group, and item information, including a user set U* and a group set G*, and for each user determining individual user-item interactions $x_u^*$;

use the neural preference encoder to predict user preference embeddings $e_u^*$ based on the individual user-item interactions $x_u^*$; using the neural preference aggregator to aggregate the user preference embeddings $e_u^*$ into group preference embeddings $e_g^*$;

retrieve from the feature database, by the neural group recommender, the feature pair having the group preference embedding $e_g$ that is most similar to the group preference embeddings $e_g^*$ and setting the individual group-item interactions $x_g^*$ equal to the individual group-item interactions $x_g$ from the feature pair; and send the individual group-item interactions $x_g^*$ to a user of group g as the ranked list of items.

17. The neural group recommender system of claim 15, wherein the user-group MI is used to measure contextual informativeness of a group member u towards the group decision through the reduction in group decision uncertainty when user u is included in group g.

18. The neural group recommender system of claim 17, wherein the discriminator D is trained to accurately separate positive samples drawn from a joint distribution from negative samples drawn from the product of marginals.

19. The neural group recommender system of claim 18, wherein the preference embeddings of (u, g) pairs are used as the positive samples ($e_u$, $e_g$) for D such that $u \in u^g$, and the negative samples are derived by pairing $e_g$ with the preference embeddings of non-member users sampled from a negative sampling distribution, wherein the negative sample encourage the discriminator to learn latent aspects shared by group members in contrast to other users with similar personal item histories.

20. A non-transitory computer-readable medium containing program instructions, which when executed by a processor cause the processor to train embedding neural networks of a base group recommender to provide item recommendations for ephemeral groups of group members, the ephemeral groups having group interaction sparsity, the program instructions for:

providing a neural preference encoder to generate user preference embeddings from individual user-item interactions extracted from payment transaction records stored in a transaction database;

providing a neural preference aggregator to aggregate the user preference embeddings into group preference embeddings, wherein the user preference embeddings and the group preference embeddings form a latent user-group latent embedding space; and training the neural preference encoder and the neural preference aggregator by regularizing the latent user-group embedding space to overcome the group interaction sparsity by:

i) training a discriminator to maximize user-group mutual information (MI) between the group preference embeddings and the user preference embeddings of the group members so that the group preference embeddings encode shared group member preferences, while regularizing the user preference embeddings to capture user social associations, and ii) contextually identifying informative group members and regularizing the corresponding group preference embeddings using a contextually weighted user loss (LUG) value based at least in part on the output of the discriminator to contextually weight users' personal preferences in each group in proportion to their user-group MI to reflect personal preferences of the identified informative group members.

* * * * *